(12) United States Patent
Giasson et al.

(10) Patent No.: US 8,727,440 B1
(45) Date of Patent: May 20, 2014

(54) AIRCRAFT SEAT

(71) Applicant: 3861589 Canada, Inc., Montreal (CA)

(72) Inventors: Brigitte Giasson, Montreal (CA);
Stephen J. Brown, Palm Bay, FL (US)

(*) Notice: Subject to any disclaimer, the term of this patent is extended or adjusted under 35 U.S.C. 154(b) by 19 days.

(21) Appl. No.: 13/837,625

(22) Filed: Mar. 15, 2013

Related U.S. Application Data

(62) Division of application No. 12/643,599, filed on Dec. 21, 2009.

(60) Provisional application No. 61/139,331, filed on Dec. 19, 2008.

(51) Int. Cl.
*A47C 1/00* (2006.01)

(52) U.S. Cl.
USPC ............ 297/344.1; 297/344.21; 297/344.18

(58) Field of Classification Search
USPC ............ 297/378.1, 378.11, 378.12, 378.13, 297/378.14, 344.1, 344.21, 344.18; 248/421
See application file for complete search history.

(56) References Cited

U.S. PATENT DOCUMENTS 4,432,525 A * 2/1984 Duvall ........................ 248/430

* cited by examiner

*Primary Examiner* — Sarah B McPartlin
(74) *Attorney, Agent, or Firm* — Mary M. Moyne; Fraser Trebilcock Davis & Dunlap, P.C.

(57) ABSTRACT

A aircraft seat having a seat tracking mechanism constructed of interlocking boxes, a seat suspension system having webbed netting, a retractable armrest, a movable headrest and a movable leg rest. The headrest has wings which extend outward from the side of the headrest to increase the size of the headrest.

33 Claims, 14 Drawing Sheets

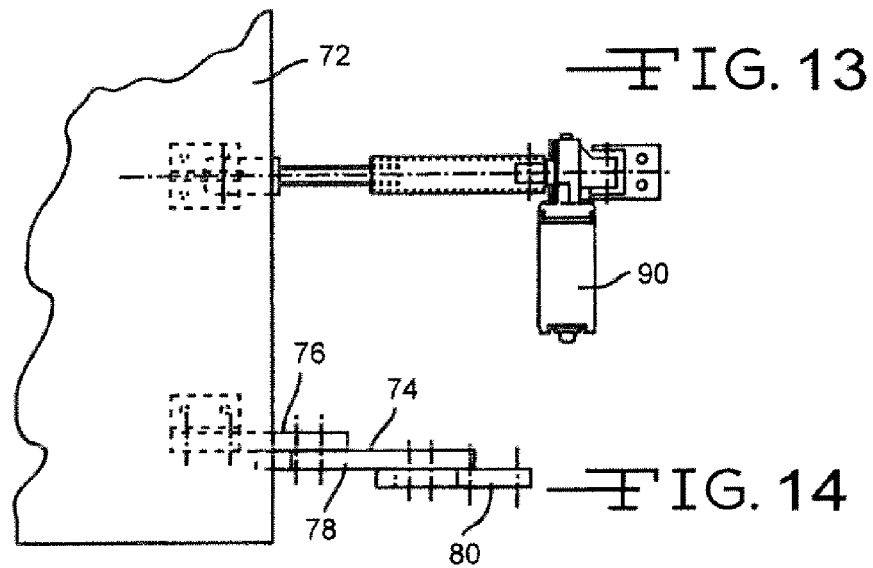
FIG. 13
FIG. 14
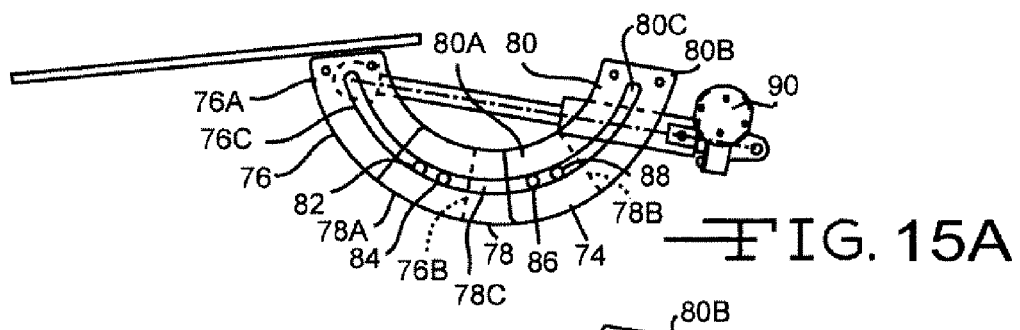
FIG. 15A
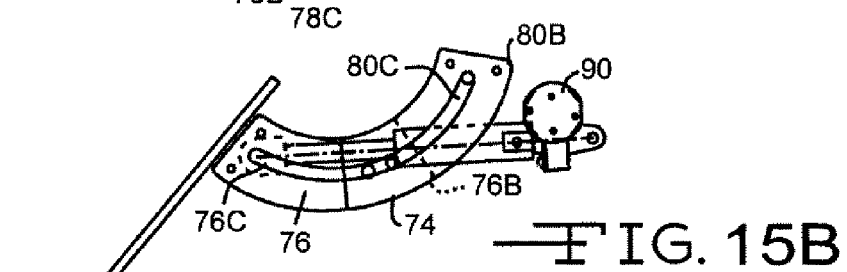
FIG. 15B
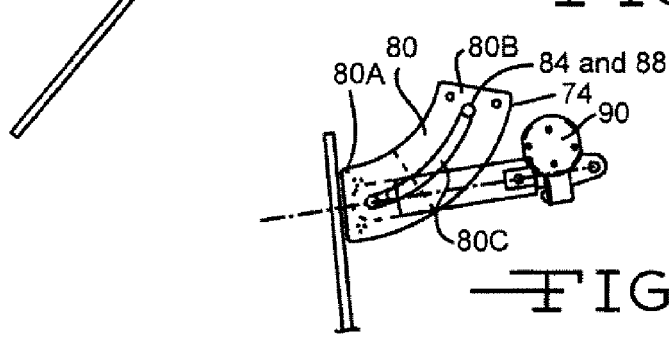
FIG. 15C

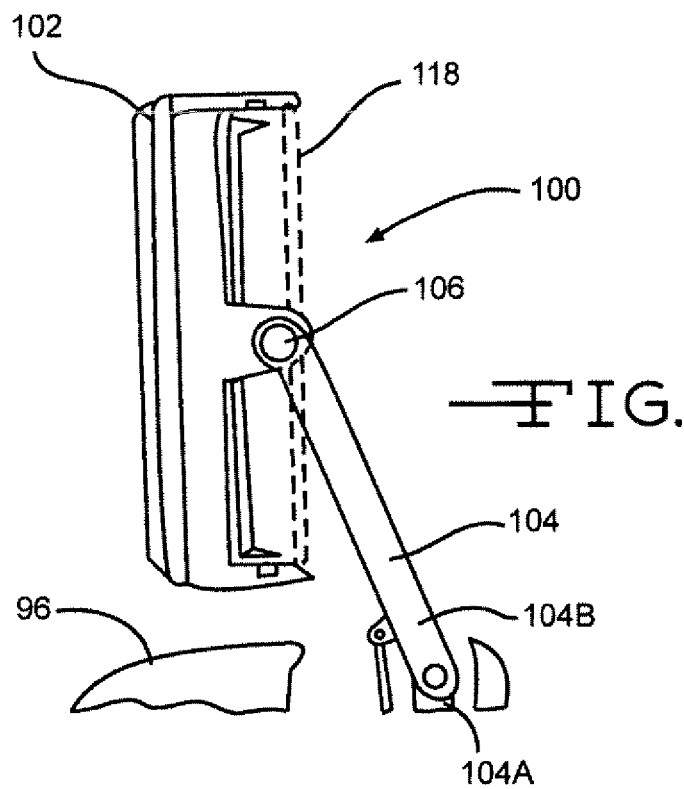

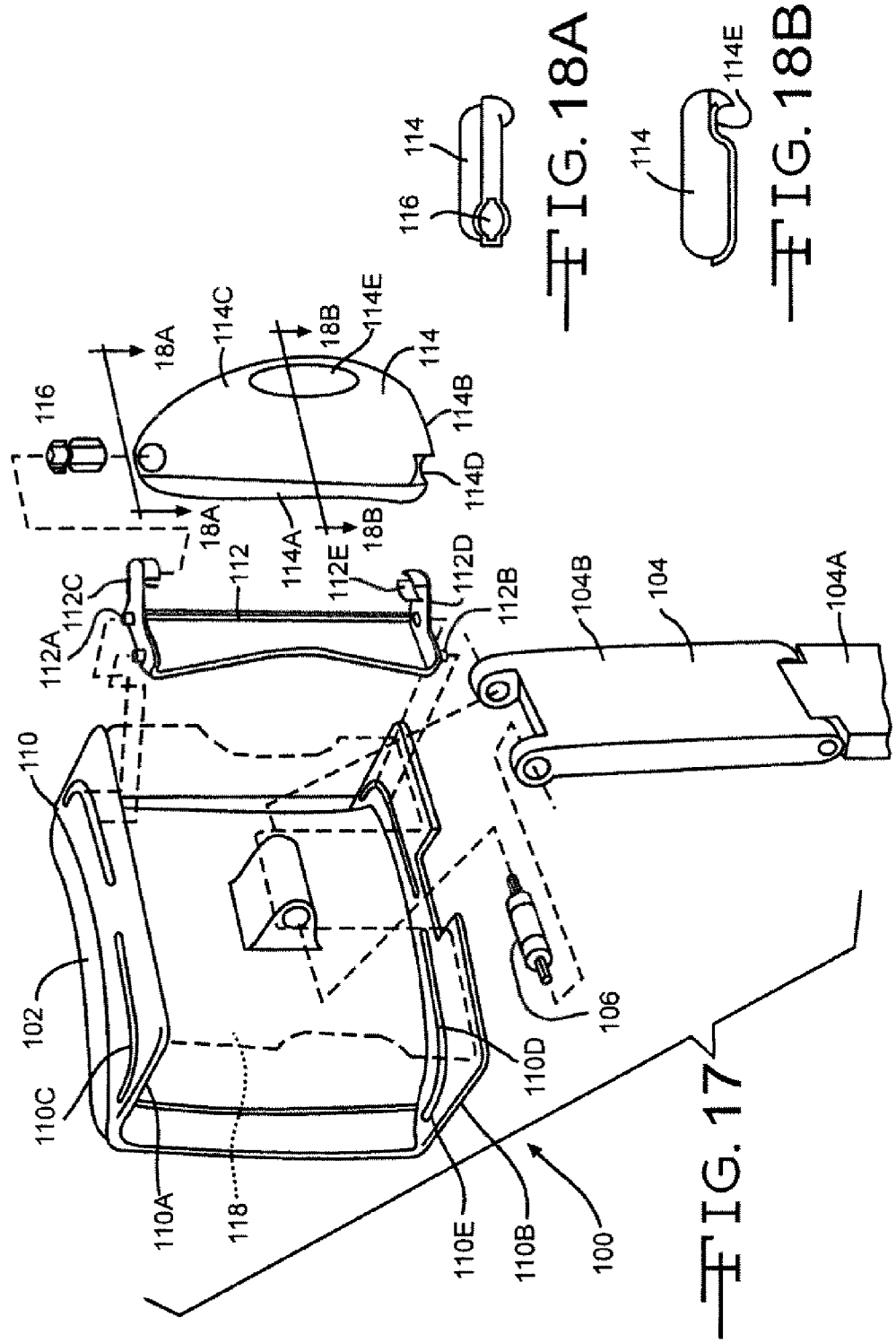

AIRCRAFT SEAT

CROSS REFERENCES TO RELATED APPLICATIONS

This application is a division of U.S. application Ser. No. 12/643,599 filed Dec. 21, 2009, which claims the benefit of U.S. Provisional Application No. 61/139,331, filed Dec. 19, 2008. The above referenced applications are hereby incorporated by reference herein in their entirety, except that the present application supersedes any portion of the above referenced applications which is inconsistent with the present application.

STATEMENT REGARDING FEDERALLY SPONSORED RESEARCH OR DEVELOPMENT

Not Applicable

BACKGROUND OF THE INVENTION

Field of the Invention

The present invention relates to single and double aircraft seats. In particular, the present invention relates to an aircraft seat having a seat tracking mechanism, a swivel mechanism, a moveable headrest, moveable leg rest, and retractable arm rest.

BRIEF SUMMARY OF THE INVENTION

A single or double aircraft seat. The aircraft seat introduces specific technology enhancements relating to design, material and methods. The aircraft seat of the present invention uses precisely molded components that minimize the need for hand fitment of metal parts and upholstery, and hand fabrication of composite parts. The aircraft seat of the present invention minimizes the material thickness and weight of the components of the seat by molding thin wall high strength materials into shapes that create monolithic components with fewer components and fasteners. The molded components require less time to produce therefore shortening component lead-times and reducing assembly times. The monolithic seat components increases structural strength and rigidity while reducing finished seat weights.

The aircraft seat includes a headrest, a leg rest, an armrest, a backrest and a seat bottom. A seat base supports the seat and has a seat tracking mechanism, a seat pan lift mechanism, and a swivel mechanism. The seat pan lift mechanism moves the seat bottom of the seat. In one (1) embodiment, the seat pan lift mechanism has four (4) lifters at each corner of the seat pan which allow for adjusting the height and the pitch of the bottom seat. The seat pan for the bottom seat has a suspension system. In one (1) embodiment, the suspension system includes webbed netting. The webbed netting extends across all four (4) sides of the seat pan. In one (1) embodiment, the suspension system includes springs intertwined with the webbed netting. The seat pan lift mechanism is mounted to the seat tracking mechanism. The seat tracking mechanism is constructed of three (3) interlocking boxes. The center, swivel box is movably mounted in the inner box and the inner box is movably mounted in the outer box. The inner box and swivel box move using a wheel and track system. In one (1) embodiment, the inner box has wheels which move along tracks in the outer box. The movement of the inner box in the outer box provides the longitudinal or forward and backward movement of the seat. In one (1) embodiment, the swivel box has wheels which move along tracks in the inner box. The movement of the swivel box in the inner box provides the latitudinal or side to side movement of the seat. The interlocking boxes of the seat tracking mechanism allows the load on the seat to be transferred over the entire seat tracking mechanism to all components of the seat tracking mechanism. The swivel mechanism is mounted in the swivel box. The swivel mechanism has an upper plate, an inner ring, spacers, and a lower ring. The upper plate is adjacent the bottom wall of the swivel box. The spacers extend between the upper plate and the leg base. The inner ring is spaced between the upper plate and the bottom wall of the swivel box. The lower ring is spaced between the bottom wall of the swivel box and the leg base. During rotation of the seat, the swivel mechanism and leg base remains stationary and the seat base and seat rotate. The inner ring and lower ring allow the swivel box to rotate smoothly between the upper ring and leg base. A locking mechanism is provided to prevent rotation of the seat. The seat base is mounted on the leg base. The leg base in one (1) embodiment, is a single molded piece. In one (1) embodiment, the leg base has a substantially circular center section with legs extending outward at an angle from the center section.

In one (1) embodiment, the armrest is retractable so as to be flush with the cushion of the bottom seat. The retractable armrest has a retraction mechanism which has a linear slide mechanism with linear bearings which enable the seat to smoothly move up and down. The retraction mechanism has braces with cam followers which move along a cam profile in a latch mechanism at one (1) end of the retraction mechanism. The braces act to lock the armrest in the up or raised position.

The leg rest is pivotable so as to retract behind the front edge of the bottom seat. The main body panel of the leg rest is connected by a hinge to the seat base. The hinge includes overlapping plates that are slidably mounted together by pins. The plates have an arcuate shape with a curved slot extending between the ends. The pins move in the slots. The radius of the circle formed by the movement of the pins in the slots is greater than the distance from the pins to the top surface of the main body panel of the leg rest so that the pivot point of the hinge is above the main body panel of the leg rest.

The headrest assembly is moveably mounted on the backrest of the seat. The headrest can move up and down vertically and can be tilted forward from vertical. The headrest has wings which extend outward from the sides of the headrest. The wings are pivotably mounted so that the wings can be angled forward. The wings are slidably mounted to the back surface of the headrest so that the wings can be retracted to be fully behind the headrest. In the fully stowed position, the wings of the headrest are behind the headrest and the headrest is stowed in a cutout at the top of the cushion of the backrest. In one (1) embodiment, the seat includes a passenger restraint system. In one (1) embodiment, the seat has a retractable light. In one (1) embodiment, the backrest has a removable shell which allows easy access to the components in the backrest. It is understood that the seat can be provided with any features usually found in an aircraft seat.

The present invention relates to a seat tracking mechanism for an aircraft seat which comprises an outer box having end rails and opposed second rails with a outer track on each side rail, an inner box mounted in the outer box and having end rails and side rails with an inner track on each end rail and wheels mounted on the side rails adjacent to and in contact with the outer track on each side rail of the outer box, and a center box mounted in the inner box having end rails and side rails with wheels mounted on the end rails adjacent and in contact with the inner track on each end rail of the inner box.

Further, the present invention relates to a swivel mechanism to rotate an aircraft seat on a leg base which comprises an upper plate having a center opening and holes and configured to be connected to the aircraft seat and the base, an inner ring having a center opening and positioned adjacent the upper plate, spacers having a first end and a second end with a center bore extending therebetween and mounted on the upper plate so that the first end is adjacent the upper plate and the center bore of the spacers is aligned with the holes in the upper plate, and a lower ring having a center opening and positioned adjacent the second end of the spacers.

Still further, the present invention relates to a leg base for an aircraft seat which comprises a center section having a center opening and configured to be mounted on a seat base of the aircraft seat and legs extending outward at an angle from the center section.

Further still, the present invention relates to a suspension system for a bottom seat of an aircraft seat which comprises webbed netting mounted on a seat pan of the bottom seat wherein the webbed netting includes transverse webs and longitudinal webs which are interwoven.

Further still, the present invention relates to a suspension system for a bottom seat of an aircraft seat which comprises a seat pan having an essentially rectangular shape with four (4) sides and web netting mounted between the four (4) sides of the seat pan.

Further still, the present invention relates to a headrest assembly for an aircraft seat which includes a headrest support having opposed ends with one (1) end configured to be slidably mounted to a backrest of the seat, a headrest having opposed sides and pivotably mounted on the other end of the headrest support, and a pair of wings slidably mounted on each side of the headrest.

Further still, the present invention relates to a backrest of an aircraft seat which comprises a cushion having a front surface, and a back surface with a first end and a second end and having a cutout in the front surface adjacent the first end and a headrest assembly slidably mounted adjacent a back surface of the cushion and having a headrest with a size less than a size of the cutout in the front surface of the cushion, the headrest being movable so that in an extended position, the headrest is spaced apart from a first end of the cushion and in a retracted position the headrest is positioned in the cutout in the front surface of the cushion.

Further still, the present invention relates to a leg rest for an aircraft seat which comprises a main body panel having a first end and a second end and pivotably mounted at a first end to a seat base of the aircraft seat and a hinge mounted between the main body panel and the seat base the hinge including an inner plate having a first end and a second end with a slot extending therebetween with the first end attached to the main body panel, a center plate having a first end and a second end with a slot extending therebetween with a first end slidably connected to a second end of the inner plate, and an outer plate having a first end and a second end with a slot extending therebetween with a first end slidably connected to a second end of the center plate and with the second end configured to be mounted to the seat base.

Further still, the present invention relates to a seat base for an aircraft seat comprising a seat pan, a seat pan lift mechanism attached to the seat pan for lifting and tilting the seat pan, an outer box mounted to the seat pan lift mechanism, an inner box movably mounted in the outer box, a swivel box movably mounted in the inner box, and a swivel mechanism mounted in the swivel box and configured to be mounted on a leg base for the aircraft seat.

Further still, the present invention relates to a retractable armrest for an aircraft seat which comprises a retraction mechanism mounted within the armrest and having a first end and a second end with the second end configured to be fixably mounted to a seat pan of the aircraft seat, a linear slide mechanism having a linear bearing and a bearing guide mounted between the ends of the retraction mechanism, a latch mechanism with a cam profile adjacent the second end of the retraction mechanism, and a brace having opposed ends and pivotably mounted at one end at the first end of the retraction mechanism and having a cam follower mounted on the outer end and positioned in the cam profile.

The substance and advantages of the present invention will become increasingly apparent by reference to the following drawings and the description.

BRIEF DESCRIPTION OF THE DRAWINGS

FIG. 13 is a top view of the hinge 74 and actuator 90 for the main body panel 72 of the leg rest 70.

FIG. 14 is a partial top view of the hinge 74.

FIG. 15A shows the main body panel 72 in the fully deployed position.

FIG. 15B shows the main body panel 72 in the partially deployed position.

FIG. 15C shows the main body panel 72 in the fully stowed position.

FIG. 16 is a side view of the headrest 102 in a raised and tilted position.

FIG. 17 is a expanded back view of the headrest 102 showing the headrest support 104, the sliding guide 112 and the wings 114.

FIG. 18A is a cross sectional view along the line A-A of FIG. 17 showing the torque insert 116 in the top of the wing 114.

FIG. 18B is a cross sectional view along the line B-B of FIG. 17 showing the groove 114E.

DETAILED DESCRIPTION OF THE INVENTION

Figure 1:
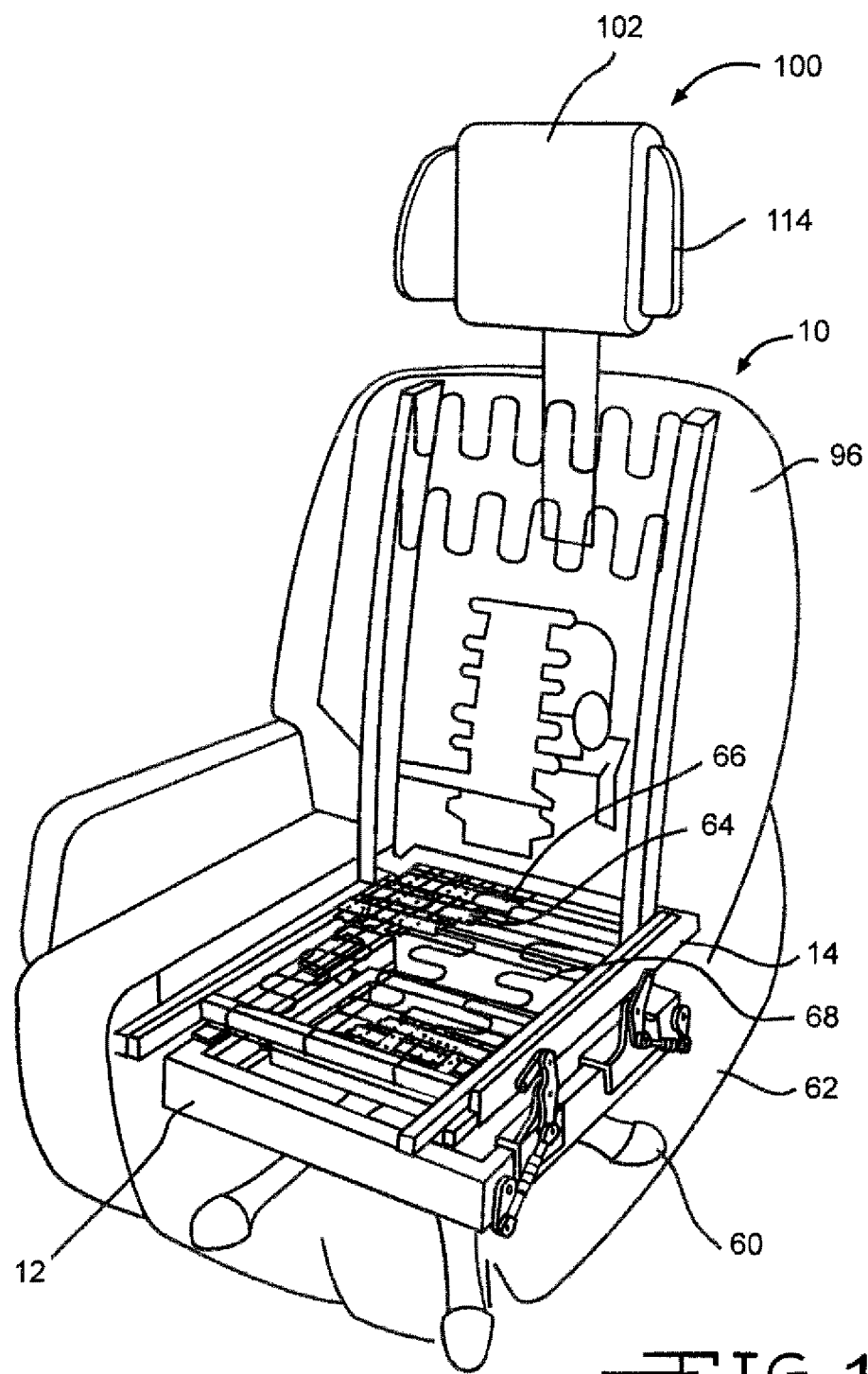
FIG. 1 is a front perspective view of the aircraft seat 10 showing the bottom seat 62 and the backrest 96.

FIG. 1 shows the aircraft seat 10 and 210 of the present invention. The seat 10 and 210 includes a leg base 60, a bottom seat 62, a backrest 96, an armrest 120, a leg rest 70 and a headrest 102. A seat base 12 is part of the bottom seat 62. The seat base 12 includes a seat pan 14, a seat pan lift mechanism 16, a seat tracking mechanism 28, and a swivel mechanism 46. In one (1) embodiment, the seat pan 14 is constructed of tubular frames and risers. In one (1) embodiment, the seat pan 14 has an essentially rectangular shape with four (4) sides. An electrically or manually driven linear drive and linear slides installed between the risers and tubular frames permit the length adjustment of bottom seat 62. A front bucket is ergonomically shaped for increased passenger comfort. In one (1) embodiment, the tubular frames, risers and front bucket are constructed of aluminum. In one (1) embodiment, the seat pan 14 is fabricated from thin wall steel stampings with CNC machined seat back attachment and recline, actuator fittings. The seat pan lift mechanism 16 supports the seat pan 14, the cushion of the bottom seat 62, the leg rest 70, the armrests 120, and the backrest 96. The seat pan lift mechanism 16 raises and lowers the bottom seat 62 and adjusts the pitch of the bottom seat 62. In one (1) embodiment, the seat pan lift mechanism 16 includes a lifter 18 at each corner of the seat pan 14 which connects the seat pan 14 to the seat tracking mechanism 28. It is understood that the seat pan lift mechanism 16 can use a variety of mechanisms to change the height and pitch of the bottom seat 62. The lifters 18 include torsion tubes 20, lever arms 22, and linkages 24 which act to raise and lower the bottom seat 62 and adjust the pitch of the bottom seat 62. The lifters 18 are supported by four (4) support posts that allow the linkages 24 to pivot. In one (1) embodiment, a turnbuckle 26 is attached to each lever arm 22. The turnbuckle 26 allows for adjusting the length of each lever arm 22. The seat pan lift mechanism 16 uses the torsion tubes 20 and independent rotary actuators to change the angle of the seat cushion of the bottom seat 62 and allow passengers to sit in a more upright position or a more reclined position relative to a normal level, by raising or lowering the back or front of the seat cushion. In one (1) embodiment, the seat pan lift mechanism 16 has two (2) torsion tubes 20. The front torsion tube adjusts the front portion of the bottom seat 62, and the back torsion tube raises and lowers the back of the bottom seat 62. The front and back torsion tubes 20 can be operated independently. The torsion tubes 20 actuate the lever arms 22 and linkages of the lifters 18 which adjust the seat pan 14 height and pitch. Two (2) electrically driven or manually driven rotary drives rotate the front and back rear torsion tubes 20. In one (1) embodiment, the front pair of lifters 18 are connected together by the front torsion tube and operate simultaneously and the back pair of lifters 18 are connected together by the back torsion tube and operate simultaneously. The seat pan 14 and seat pan lift mechanism 16 for the double seat 210 is substantially similar to the seat pan 14 and seat pan lift mechanism 16 of the single seat 10. The seat pan lift mechanism 16 is mounted on the seat tracking mechanism 28.

Figure 6:
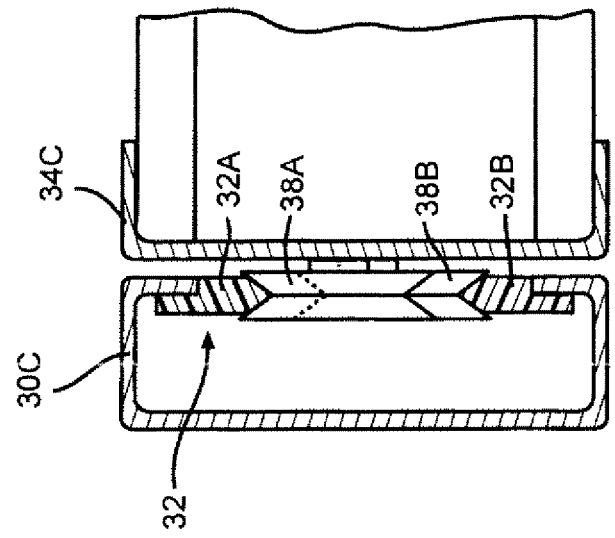
FIG. 6 is a cross sectional view along the line A-A of FIG. 4, showing the wheels 38 of the inner box 34 moving along the top and bottom tracks 32A and 32B of the outer box 30.

The seat tracking mechanism 28 is constructed of three (3) interlocking boxes 30, 34 and 42. The boxes include an outer box 30, an inner box 34, and the center, swivel box 42. The inner box 34 is movably mounted in the outer box 30 and the swivel box 42 is movably mounted in the inner box 34. The outer box 30 has front and back end rails 30A and 30B with side rails 30C extending therebetween. In one (1) embodiment, the top and bottom of the outer box 30 are open. In one (1) embodiment, the outer box 30 has a rectangular shape with the side rails 30C having a length greater that the end rails 30A and 30B. The rails 30A, 30B and 30C of the outer box 30 surround a center area 30D. The outer box 30 is positioned so that the front end rail 30A is adjacent the front of the seat 10 and the back end rail 30B is adjacent to the backrest 96 of the seat 10. The inner side of each side rail 30C is provided with an outer track 32. In one (1) embodiment, the outer track 32 is an upside down v-groove track having an angled surface (FIG. 6). In one (1) embodiment, the outer track 32 includes a top track 32A and a bottom track 32B. The top track 32A is spaced apart and parallel to the bottom track 32B. In one (1) embodiment, the outer track 32 extends substantially along the entire length of the side rails 30C between the end rails 30A and 30B. The inner box 34 is movably mounted in the center area 30D of the outer box 30. The outer track 32 of the side rails 30C of the outer box 30 form the longitudinal outer track 32 for the wheels 38 of the inner box 34.

Figure 5:
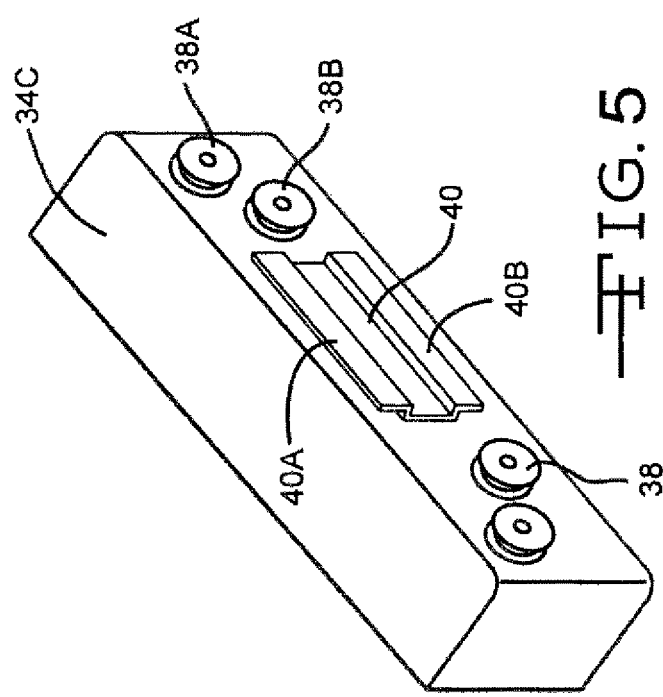
FIG. 5 is a perspective view of the side rail 34C of the inner box 34 of the seat tracking mechanism 28 showing the wheels 38 the keeper 40.
Figure 7:
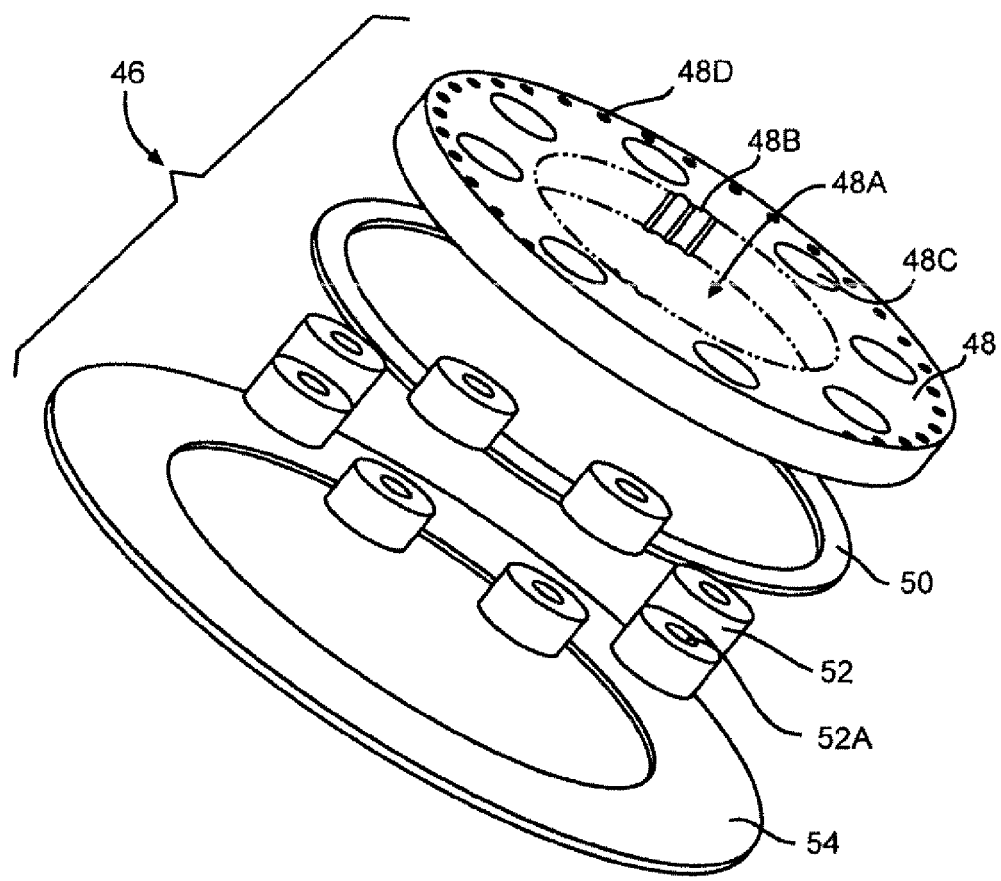
FIG. 7 is an exploded view of the swivel mechanism 46 showing the upper plate 48, the inner ring 50, spacers 52 and lower ring 54.

The inner box 34 has front and back end rails 34A and 34B with side rails 34C extending therebetween. The inner box 34 has an essentially rectangular shape with a length of the end rails 34A and 34B greater than a length of the side rails 34C. The rails 32A, 32B and 34C of the inner box 34 surround a center area 34D. In one (1) embodiment, the top and bottom of the inner box 34 are open. The inner box 34 is positioned in the interior or center area 30D of the outer box 30 so that the front end rail 34A of the inner box 34 is adjacent to the front end rail 30A of the outer box 30, the back end rail 34B of the inner box 34 is adjacent the back end rail 30B of the outer box 30 and the side rails 34C of the inner box 34 are adjacent and parallel to the side rails 34C of the outer box 30. The outer surface of each side rail 34C of the inner box 34 adjacent each side rail 30C of the outer box 30 is provided with wheels 38 or bearings. The wheels 38 are mounted to the side rail 34C by an means well known in the art. In one (1) embodiment, the wheels 38 are bearings which have a v-shaped groove in the surface. In one (1) embodiment, the wheels 38 are dual v integral wheels manufactured by Bishop-Wisecarver of Pittsburg, Calif. The v-shaped groove in the surface of the wheels 38 mates with the angled or v-shaped outer track 32 of the outer box 30 which aligns the wheels 38 in the outer track 32. In one (1) embodiment, the wheels 38 include an upper wheel 38A and a lower wheel 38B. In one (1) embodiment, the upper and lower wheels 38A and 38B are spaced apart both vertically and horizontally. During movement of the inner box 34 in the outer box 30, the lower wheel 38B contacts and moves along the bottom track 32B of the outer box 30 and the upper wheel 38A contacts and moves along the top track 32A of the outer box 30. The two (2) wheels 38A and 38B reduce the extraneous movement of the inner box 34 in the outer box 30. In one (1) embodiment, each side rail 34C of the inner box 34 includes two (2) sets of wheels 38 for a total of four (4) wheels on each side rail 34C of the inner box 34. In one (1) embodiment, a set of wheels 38 is positioned adjacent each end rail 34A and 34B of the inner box 34. The use of two (2) sets of wheels 38 adjacent each end rail 34A and 34B increases the stability of the inner box 34 as the inner box 34 moves in the outer box 30. In one (1) embodiment, the outer surface of the side rails 34C of the inner box 34 are provided with a keeper 40. The keeper 40 extends outward from the outer surface of the side rail 34C and has an upper flange 40A and a lower flange 40B (FIG. 5). The keeper 40 is positioned in the side rails 30C of the outer box 30 spaced between the outer track 32 and the outer wall of the side rails 30C. The keeper 40 helps to guide the movement of the inner box 34 along the tracks 32 of the outer box 30 and prevents the inner box 34 from disengaging from the outer box 30 (FIG. 5). The movement of the inner box 34 along the tracks 32 of the outer box 30 provides the longitudinal or front and back, fore and aft movement of the seat 10 and 210. The inner side of each of the end rails 34A and 34B of the inner box 34 includes an inner track 36. In one (1) embodiment, the tracks 36 are similar to the tracks 32 of the outer box 30 and includes a top track spaced apart and parallel to a bottom track. In one (1) embodiment, the tracks 36 are upside down v-groove tracks similar to the tracks 32 of the outer box 30. In one (1) embodiment, the tracks 36 of the inner box 34 extend substantially the entire length of the end rails 34A and 34B between the side rails 34C of the inner box 34. The center, swivel box 42 is mounted in the center area 34D of the inner box 34.

The swivel box 42 has a front wall (not shown), a back wall 42B with two side walls 42C extending therebetween. The walls 42B and 42C of the swivel box 42 surround the interior of the swivel box 42. A bottom wall 42D extends along the bottom of the front, back and side walls 42B and 42C. The bottom wall 42D has an opening 42E. In one (1) embodiment, the top of the swivel box 42 is open. The swivel box 42 is positioned in the center area 34D of the inner box 34 so that the front wall of the swivel box 42 is adjacent the front end rail 34A of the inner box 34 and the back wall 42B is adjacent the back end rail 34B of the inner box 34. The outer surface of the front and back walls 42B of the swivel box 42 are provided with wheels or bearings adjacent to the tracks 36 in the front and back end rails 34A and 34B of the inner box 34. In one (1) embodiment, the wheels are similar to the v-grooved wheels 38 of the inner box 34. In one (1) embodiment, the front and back walls 42B of the swivel box 42 are each provided with two (2) sets of wheels. The sets of wheels of the swivel box 42 are similar to the sets of wheels 38 of the inner box 34 and include an upper wheel and a lower wheel. Similarly to the inner box 34, the swivel box 42 has a two (2) sets of wheels on the front and back walls 42B adjacent the side walls 42C of the swivel box 42. The wheels of the swivel box 42 move along the tracks 36 of the inner box 34 as the swivel box 42 moves in the inner box 34. The movement of the swivel box 42 in the inner box 34 provides the lateral or side to side movement of the seat 10 and 210.

The tracks 32 and 36 are mounted directly to the seat base 12 to increase rigidity, structural strength, and provide a smooth linear motion. In one (1) embodiment, the longitudinal tracks 32 of the outer box 30 and lateral tracks 36 of the inner box 34 are precision ground linear tracks. In one (1) embodiment, the seat tracking mechanism 28 is constructed of extruded aluminum sections, stamped aluminum caps, and stamped steel components. The inner box 34 and swivel box 42 of the seat tracking mechanism 28 can be electrically or manually driven longitudinally and laterally respectively within the outer box 30 and the inner box 34 respectively. In one (1) embodiment, the inner box 34, outer box 30 and swivel box 42 are constructed of stamped steel which enables the use of thinner materials with higher strength providing a more rigid seat base 12 with less cost. In one (1) embodiment, linear actuators (not shown) with manual override functions are integrated into the inner box 34 and swivel box 42 to drive each motion. In one (1) embodiment, the manual override is connected to the combined manual release handle (not shown) installed on the armrest. The double seat 210 uses a seat tracking mechanism similar to the seat tracking mechanism 28 of the single seat 10. In one (1) embodiment of the double seat 210, the seat tracking mechanism of the outboard seat only has two (2) interlocking boxes and can be adjusted longitudinally. In one (1) embodiment, the seat 10 or 210 is able to move approximately 9.0 inches (228.6 mm) longitudinally and 5.0 inches (127 mm) laterally.

The seat tracking mechanism 28 is sized based on the loads from the seat 10 or 210 and uses the geometry of a box-like structure. There is a direct load transfer from the seat 10 or 210 to the seat tracking mechanism 28. The entire seat pan 14 and seat tracking mechanism 28 are combined into one (1) element. The seat tracking mechanism 28 and seat pan 14 are combined into the seat base 12. This enables the seat base 12 to be sized to carry more load and use less material and reduce weight. By combining the seat pan 14 and seat tracking mechanism 28, the number of parts is reduced and the various components of the seat pan 14 and seat tracking mechanism 28 can be positioned so that the components overlap each other and transfer loads over a larger area. The seat tracking mechanism 28 is combined with the seat pan 14 by directly mounting the seat tracking mechanism 28 to the seat pan 14. Loads are distributed within the entire seat tracking mechanism 28 rather than being isolated at the ends of the seat tracking mechanism 28. This allows for the loads to be redistributed more evenly and allows for the seat base 12 to be reduced in size. Fasteners are eliminated by using structural elements and redistributing the loads over a larger area. The seat tracking mechanism 28 allows the fore and aft and lateral side to side movement with each movement transferring load from one component to another. The load is transferred to the entire seat tracking mechanism 28. In the interlocking box frame structure, the outer, inner and swivel boxes 30, 34 and 42 interlock under dynamic or structural loads which enables the seat tracking mechanism 28 to bear the load over the entire length of each component and not rely on the wheels 38 alone to carry or transfer the loads. Under structural loads, the boxes 30, 34 and 42 of the seat tracking mechanism 28 are interlocking in the sense that the geometries overlap. The overlap of boxes 30, 34 and 42 allows the loads to be transferred directly from one component of the seat tracking mechanism 28 to the next component of the seat tracking mechanism 28. The wheels 38 of the inner and swivel boxes 34 and 42 are flexible and the fasteners used in the seat tracking mechanism 28 are flexible. Under structural loads, the wheels 38 and fasteners deflect or bend and the load transfer is transferred to the interlocking boxes 30, 34 and 42. The fasteners do not transfer load. The interlocking boxes 30, 34 and 42 transfer the load. As the fasteners for the for the wheels 38 deflect under ultimate loads, the load transfer is directly from the boxes 30, 34 and 42. The load is transferred from one box to another box. It is understood that there will be a load on the wheels 38. The load on the wheels 38 is present up until a point where the deflection occurs. The wheels 38 carry whatever load the fasteners for the wheels 38 can carry until bending or deflection. Subsequent to that point, the interlocking boxes 30, 34 and 42 carry the load. If the fasteners for the wheels 38 fail, the load carrying capabilities through the boxes 30, 34 and 42 remains. The boxes 30, 34 and 42 are the ultimate load carrying capability. The boxes 30, 34 and 42 are sized for the load. By having the boxes 30, 34 and 42 sized appropriately, and having the flexibility of sizing those components, the components of the seat base 12 can be adjusted in size and components can be combined to reduce weight. The material thickness and the material type for the structural components of the boxes 30, 34 and 42 and other components of the seat base 12 can be selected based on the loads.

The swivel mechanism 46 is mounted in the interior of the swivel box 42. The swivel mechanism 46 is mounted on the bottom wall 42D of the swivel box 42 and extends through the opening 42E in the bottom wall 42D of the swivel box 42. The swivel mechanism 46 includes an upper plate 48, an inner ring 50, spacers 52 and a lower ring 54. In one (1) embodiment, the upper plate 48 has a circular shape with a center opening 48A. However, the upper plate 48 can have a variety of shapes. The perimeter of the center opening 48A of the upper plate 48 is provided with gear teeth 48B. The outer diameter or outer size of the upper plate 48 is greater that the opening 42D in the bottom wall 42D of the swivel box 42. The upper plate 48 is positioned in the interior of the swivel box 42 so that the center opening 48A of the upper plate 48 is aligned with the opening 42E of the bottom wall 42D of the swivel box 42. The upper plate 48 has holes 48C which extend through the upper plate 48. The holes 48C are spaced around the upper plate 48 between the center opening 48A and the perimeter of the upper plate 48. The holes 48C are positioned so that when the upper plate 48 is positioned in the swivel box 42, the holes 48C are located over the opening 42E in the bottom wall 42D of the swivel box 42. In one (1) embodiment, the upper plate 48 is machined. The inner ring 50 is positioned between the upper plate 48 and the bottom wall 42D of the swivel box 42. In one (1) embodiment, the inner ring 50 has a circular shape. However, the inner ring 50 can have a variety of shapes. In one (1) embodiment, the inner ring 50 is constructed of Teflon®. The inner ring 50 has a center opening and is sized such that the inner ring 50 does not interfere with the holes 48C in the upper plate 48. The spacers 52 have an essentially cylindrical shape with a first and second end and a center bore 52A extending there through. However, it is understood that the outer shape of the spacers 52 can vary. The spacers 52 are positioned so that the center bore 52A of the spacers 52 is aligned with the holes 48C in the upper plate 48. In one (1) embodiment, there are eight (8) spacers 52. The length of the spacers 52 is such that when a first end of the spacers 52 is adjacent the upper plate 48, the spacers 52 extend downward through the opening 42E in the bottom wall 42D of the swivel box 42 and extend beyond the bottom wall 42D of the swivel box 42. The spacers 52 keep the swivel box 42 centered and allow the swivel box 42 and seat tracking mechanism 28 and seat 10 or 210 to rotate. A lower ring 54 is provided between the bottom wall 42D of the swivel box 42 and the leg base 60. In one (1) embodiment, the lower ring has a circular shape with a center opening. However, the outer shape of the lower ring can vary. The spacers 52 are within the center opening of the inner ring 50 and the lower ring 54. In one (1) embodiment, the lower ring 54 is constructed of Teflon®. In one (1) embodiment, the second end of the spacers 52 is substantially flush with the bottom surface of the lower ring 54 opposite the swivel box 42. In one (1) embodiment, the upper plate 48 and spacers 52 are constructed of aluminum.

Figure 9:
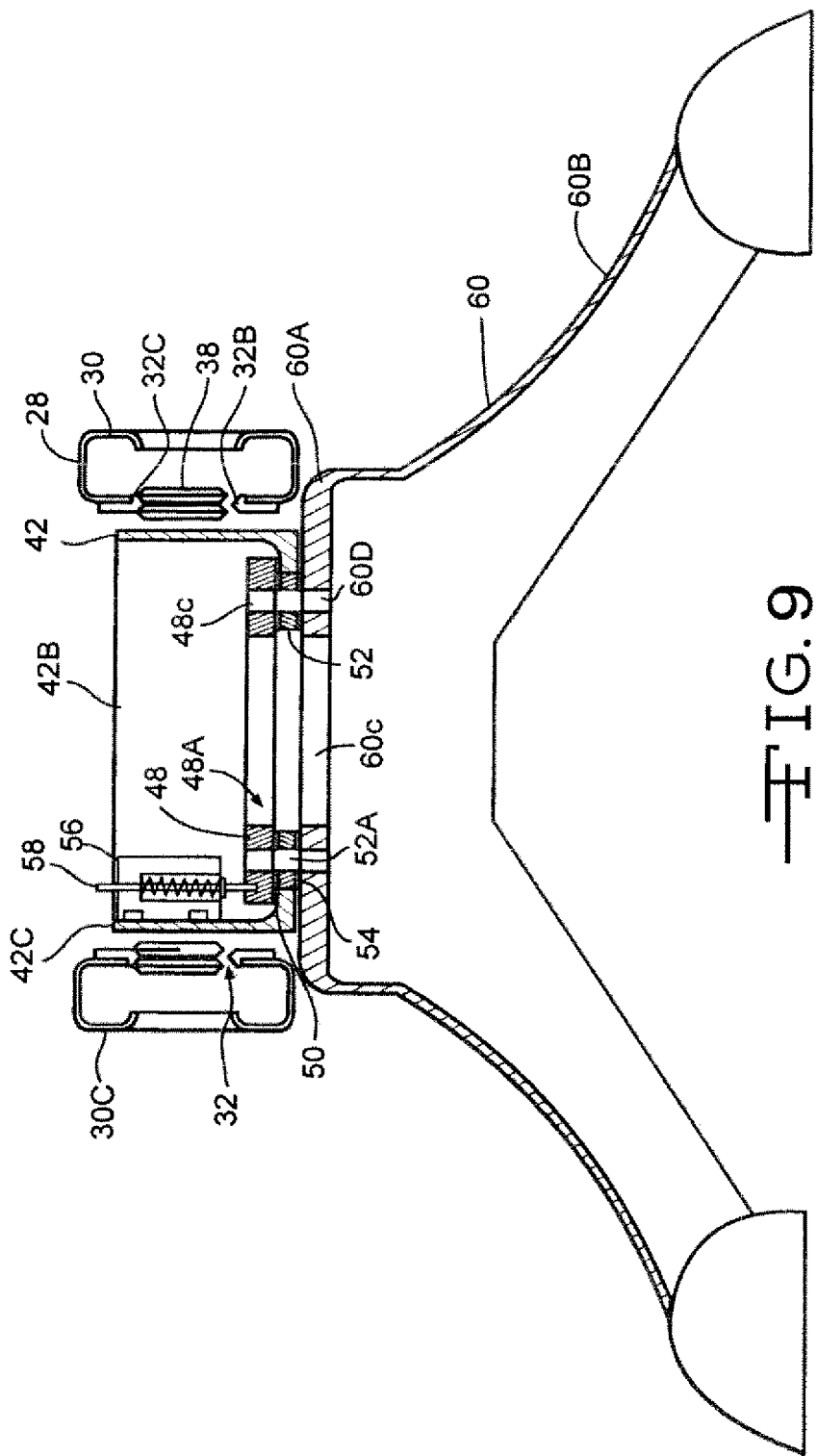
FIG. 9 is a cross section view of the seat base 12 and the leg base 60 showing the swivel mechanism 46.
Figure 10:
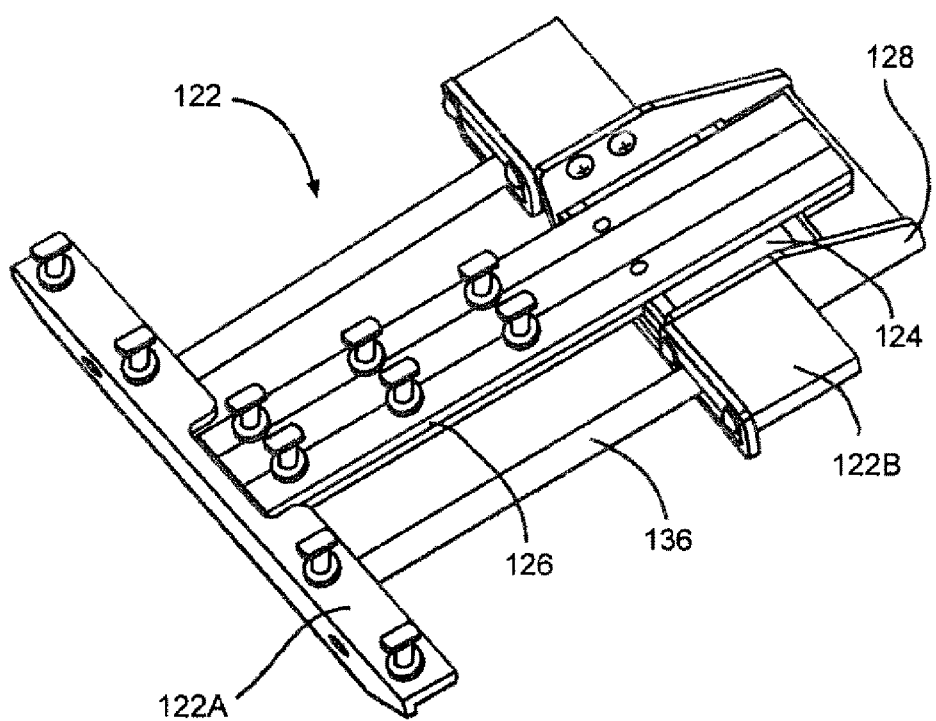
FIG. 10 is a top perspective view of the retraction mechanism 122 for the armrest 120 of the double seat 210.
Figure 11:
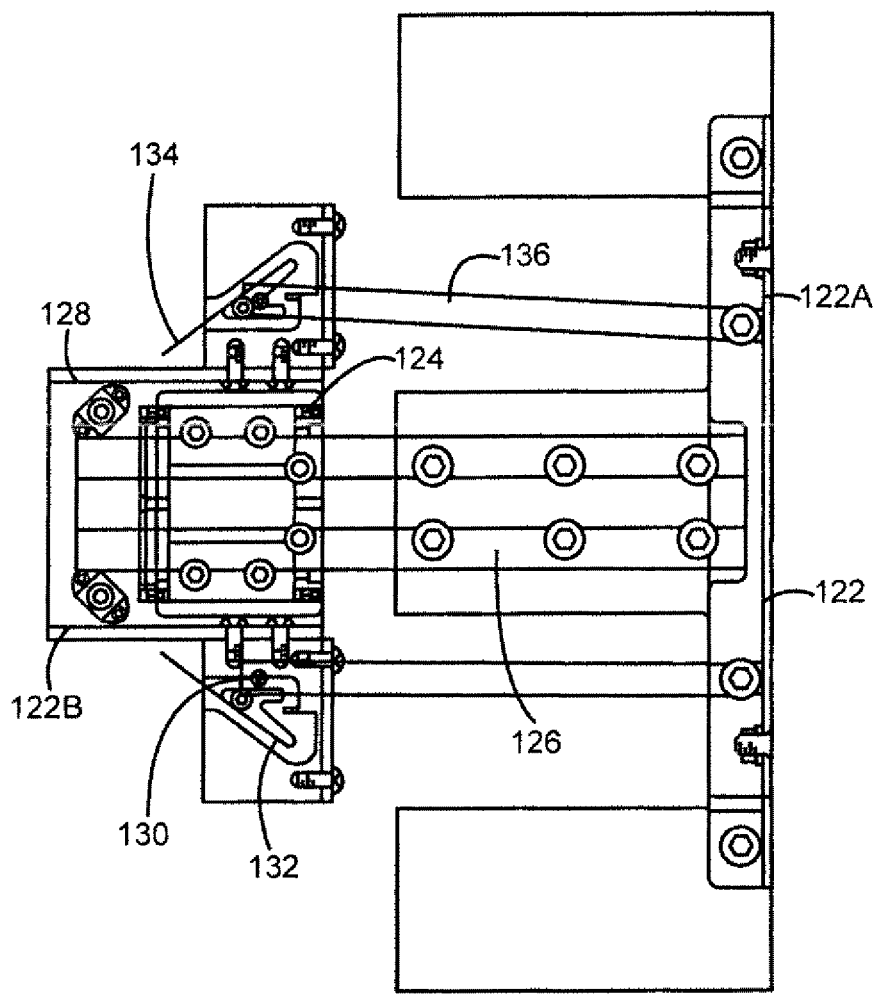
FIG. 11 is a bottom perspective view of the retraction mechanism 122 for the armrest 120 of the double seat 210 showing the braces 136, cam follower 130 and cam profile 132.

A locking mechanism 56 is provided for the swivel mechanism 46 which limits the range of rotate or swivel of the swivel mechanism 46 and locks the swivel mechanism 46 to prevent rotation. In one (1) embodiment, the upper plate 48 includes locking holes 48D spaced around the perimeter of the upper plate 48. In one (1) embodiment, the locking mechanism 56 includes a spring loaded plunger pin 58 that is attached to the swivel box 42. In one (1) embodiment, the plunger pin 58 is released using a solenoid actuator and wire rope cable with manual override. When released, the plunger pin 58 extends into a locking hole 48D to lock the seat base 12 to the upper plate 48. The locking mechanism 56 can be a motorized function or as a manually operated function with an electrical release (FIG. 9). The swivel mechanism 46 permits rotational adjustment of the seat 10 or 210 and forms the joint between the leg base 60 and seat tracking mechanism 28.

Figure 8:
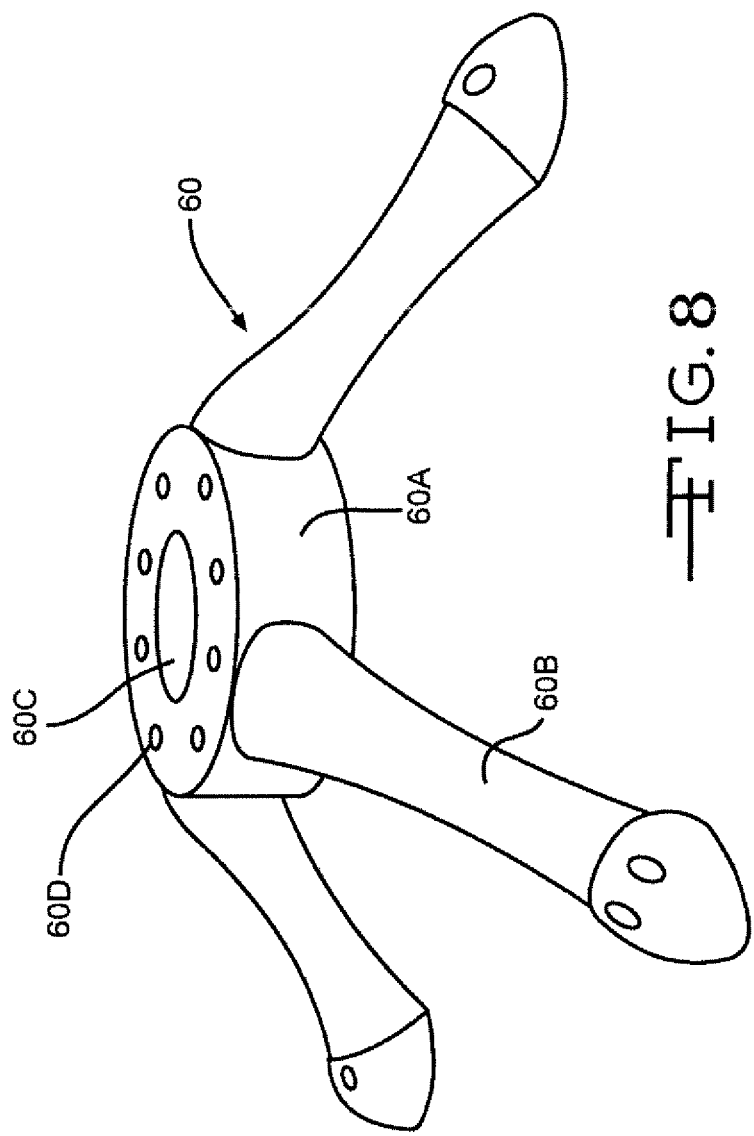
FIG. 8 is a perspective view of the leg base 60.

The leg base 60 includes a center section 60A with legs 60B extending outward from the center section 60A at an angle (FIG. 8). In one (1) embodiment, the center section 60A is substantially circular. In one (1) embodiment, the leg base 60 has four (4) legs 60B equally spaced apart around the circular center section 60A. The legs 60B extend outward at an angle from the center section 60A. In one (1) embodiment, the leg base 60 has a pyramid shape with a truncated apex. The truncated apex is formed by the center section 60A of the leg base 60. The top surface of the center section 60A is flat which allows for more secure mounting of the seat base 12 on the leg base 60. Since the center section 60A is a single piece with the legs, the top surface of the center section 60A is a stable surface on which to mount the swivel mechanism 46. The center section 60A has an opening 60C which allows electrical connections to be fed through the leg base 60 into the seat 10 or 210. The center section 60A of the leg base 60 is aligned with the swivel mechanism 46 of the seat base 12. The center section 60A of the leg base 60 is securely fastened to the swivel mechanism 46 of the seat base 12 (FIG. 9). In one (1) embodiment, the leg base 60 is mounted to the seat base 12 by fasteners which extend through holes 48C in the upper plate 48 of the swivel mechanism 46, through the center bores 52A of the spacers 52 and into holes 60D in the center section 60A of the leg base 60. Securing the swivel mechanism 46 to the leg base 60, secures the seat tracking mechanism 28 to the leg base 60. The leg base 60 provides a stable base for mounting the seat base 12. The upper plate 48 of the swivel mechanism 46 clamps the seat tracking mechanism 28 to the leg base 60. When the swivel mechanism 46 is attached to the leg base 60, the bottom wall 42D of the swivel box 42 is sandwiched between the upper plate 48 and the leg base 60. Thus, when the seat base 12 is rotated, the seat 10 or 210 and rotates the swivel mechanism 46 and the leg base 60 remain stationary The seat base 12 can be rotated by any electrical or manual means well known in the art. When manually rotated, the locking mechanism 56 is unlocked so that the seat base 12 can be moved on the swivel mechanism 46 and the leg base 60. When the seat base 12 and seat 10 or 210 are rotated by a motor or other electrical means, the gear teeth 48B of the upper plate 48 are used to rotate the seat base 12 on the swivel mechanism 46 and the leg base 60. A motorized swivel actuator mounted on the seat base 12 engages the gear teeth 48B and rotates the seat base 12 on the upper plate 48 of the swivel mechanism 46. In one (1) embodiment, the actuator is mounted in the swivel box 42. In one (1) embodiment, the swivel mechanism 46 has a manual override. The manual override is connected to the combined manual release handle installed on the armrest. In one (1) embodiment, the swivel mechanism 46 allows the seat 10 to be swiveled up to 270 degrees. For the double seats 210, the inboard and outboard seats include the swivel mechanism 46 for rotational adjustment. The swivel mechanism for the double seat 210 is substantially similar to the swivel mechanism 46 for the single seat 10. The swivel mechanism for the double seat 210 allows both seats to be swiveled up to 180 degrees. In one (1) embodiment, both seats of the double seat have a swivel mechanism. In one (1) embodiment, for the double seat 210, the outboard seat does not have a swivel mechanism. The seat tracking mechanism 28 evenly distributes the loads from the seat 10 or 210 into the swivel mechanism 46 allowing for reduced material and less fasteners to reduce weight. The seat tracking mechanism 28 is mounted on the leg base 60, so that the loads travel inward through the leg base 60. There is no secondary load path from the seat tracking mechanism 28 down to the leg base 60. The load from the seat tracking mechanism 28 is transferred directly onto the leg base 60.

In one (1) embodiment, the leg base 60 is a single, monolithic piece. In one (1) embodiment, the leg base 60 is a single, molded piece. The use of a single molded piece reduces assembly time and increases the ridgity and strength of the leg base 60 without increasing the weight of the leg base 60. The use of a single molded leg base 60 reduces the weight of the leg base 60 without reducing the strength of the leg base 60 and reduces the assembly time and parts since the leg base 60 is aesthetically pleasing and does not need to be covered. The leg base 60 is one (1) piece so the legs 60B do not need assembly or adjustments. In one (1) embodiment, the leg base 60 is constructed from stamped steel sections that are welded together to form a strong, light weight, monolithic piece. The use of stamped steel creates an aesthetic leg base 60 which can be left exposed. The leg base 60 eliminates redundant components such as the sheet metal shrouds, fasteners and joints. The leg base 60 is capable of transferring loads over the entire surface of the leg base 60. The loads are not transferred through specific mechanical joints. The leg base 60 provides an even redistribution of loads within each of the floor attachments. This enables the weight of the seat 10 or 210 to be reduced. The shape of the leg base 60 offers a better distribution of the loads. The leg base 60 improves the structural strength of the seat 10 or 210 by reducing the number of joints, providing an improved load distribution between the attachments, and creating a more direct load path for ultimate loading conditions. The leg base 60 also improves cabin ventilation, increases passenger leg room, and reduces seat weight.

Figure 2:
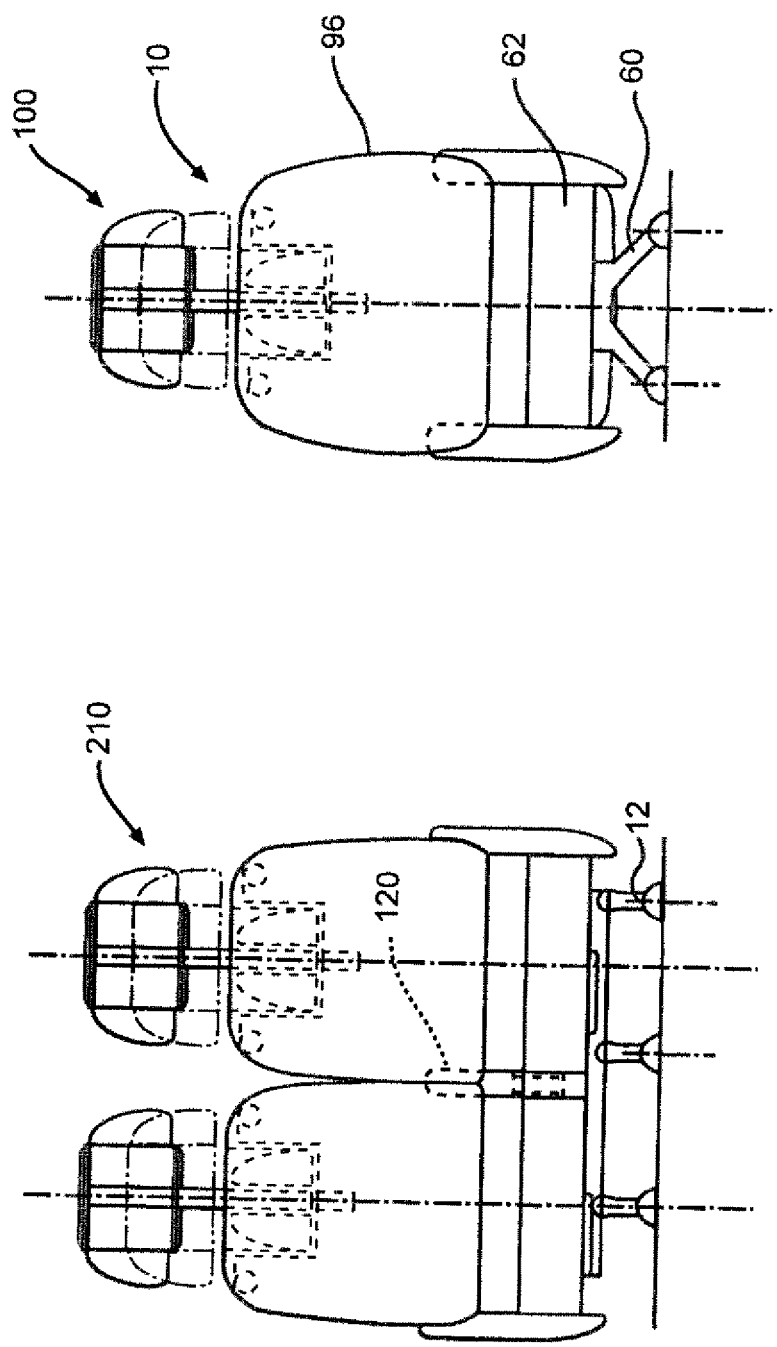
FIG. 2 is a back view of a single seat 10 and a double seat 210 showing the headrest 102 in the fully stowed position in phantom.

The leg base 60 attaches to the standard style aircraft seat tracks (not shown) using quick release seat track fittings to facilitate the installation and removal of the seat. In one (1) embodiment, the attachments are hidden using molded caps that allow ease of access. An optional floor tracking assembly system (not shown) can be adapted to the leg base 60. In one (1) embodiment, the angled legs 60B of the seat base 12 lead from the lower attachment points to the center of the seat base 12 and the swivel mechanism 46. In one (1) embodiment, the emergency and cosmetic aisle lights are molded directly within the leg base 60 so that the lights are in a fixed location and always pointing into the aisle. In one (1) embodiment, the life vest and smoke hood can be stored in a molded storage box (not shown) that will attach to the aircraft floor underneath the leg base 60. A tether (not shown) at the front of the storage box permits retrieval of the life vest and smoke hood. For the double seat 210, a common leg base 60 supports both upper seats (FIG. 2). The leg base for the double seat 210 is constructed similar to the leg base 60 of the single seat 10.

The bottom seat 62 includes a suspension system 64 having load bearing webbed netting 66 (FIG. 1) The suspension system 64 is mounted to the seat pan 14. The webbed netting 66 allows for a reduction in the thickness of the seat cushion, allows for attenuation of lumbar loads, and improves the comfort of the seat 10 or 210. The reduction of the thickness of the seat cushion plays a significant role in reducing the weight of the seat 10 or 210. The webbed netting 66 increases the ability to control the passenger movement within the seat 10 or 210 under a dynamic load condition. The webbed netting 66 also controls the amount of deflection the passenger creates on the bottom seat 62. The webbed netting 66 allows for deflection and forms part of the cushion which effects how the seat cushion feels and the comfort level of the seat cushion. The webbed netting 66 increases passenger comfort since there are no hard surfaces felt through the seat cushion. The webbed netting 66 also attenuates lumbar loads and is part of the structural design. In one (1) embodiment, the suspension system 64 includes sinusoidal springs 68 interlaced with webbed netting 66. The webbed netting 66 is interlaced with the springs 68 to limit the passenger deflection under ultimate loads and to attenuate lumbar loads. The webbed netting 66 is intertwined with the springs 68 to provide damping or variation in cushion compression strengths. The addition of the springs 68 provides a range of comfort in between. The webbed netting 66 carries the bulk of the heavier loads. The webbed netting 66 is woven over and under the various springs 68. In one (1) embodiment, the webbed netting 66 includes longitudinal and transverse webs to provide support on all four (4) sides of the seat pan 14. The transverse webs are interwoven with the longitudinal webs to form a cross weave pattern. The webbed netting 66 is stitched at the joints, so that the transverse webs are securely attached to the longitudinal webs and the load is transferred through the webbed netting 66 as a whole. In one (1) embodiment, suspension system 64 uses only a webbed netting 64 and does not use springs 68. The quantity and number of webs or straps in the webbed netting 66 can be adjusted to accomplish the sizing or adjustment based on load requirements.

The cushion of the bottom seat 62 uses a continuous form that has no breaks. The cushion is molded using fire blocked polyurethane foam poured into precisely machined molds. The foam is available in varying densities to enable adjustment of the design for passenger comfort and to provide a sound base for the upholstery. An occupant load sensor shall be installed between the foam cushion and the cushion support structure which will signal that a mass having a minor weight has been placed on the cushion. The sensor is capable of reporting to the cabin management system and incorporate an on/off override switch.

The armrests (not shown) on the single seat are fixed components made from sandwiched composite panels. In one (1) embodiment, the armrests are a monolithic piece which can be load bearing. The armrests are lightweight, stiff and durable. In one (1) embodiment, the armrest is molded in two (2) sections for ease of upholstery. Since the armrest is two pieces, if the upper upholstered section of the armrest is damaged, the upper section can be removed and replaced. The upper section is a molded piece which is separate from the lower section. The armrest is molded to reduce sharp angles and to reduce wear and tear on the armrest. The armrests are mounted directly to the adjustable seat pan 14 to maintain the relative geometry between the bottom cushion and the armrest. In one (1) embodiment, a molded manual override control handle for manual recline, tracking, and swivel function is integrated into the armrest. In one (1) embodiment, the armrest is constructed of a honeycomb composite material. Using molded components with hidden fasteners to provide ease of upholstery and increased quality, allows for fewer seams, which translates into lower weight.

In the double seat 210, the center armrest 120 is adjustable. The center armrest 120 retracts downward level with the bottom cushion of the bottom seat 62 providing a fully flush and level surface. The retraction mechanism 122 is internal to the armrest 120. The retraction mechanism 122 for the armrest 120 is fully enclosed in the armrest 120. In one (1) embodiment, the outboard armrest of the double seat 210 includes the retraction mechanism 122. The retraction mechanism 122 includes a linear slide mechanism which has linear bearings 124 and a bearing guide 126 to smoothly raise and lower the armrest 120. A bracket 128 at the bottom end 122B of the retraction mechanism 122 is mounted to the seat pan 14. The retraction mechanism 122 has a pair of braces 136 which are pivotably attached at one end to the top end 122A of the retraction mechanism 122. The other end of the braces 136 has a cam follower 130 which moves along a cam profile 132 in a latch mechanism at the bottom end 122B of the retraction mechanism 122. The shape of the cam profile 132 is such that when the armrest 120 is pulled upward, the cam follower 130 moves along the cam profile 132 until the cam follower 130 can no longer move upward. When the armrest 120 is released, the cam follower 130 drops into a v-shaped groove in the cam profile 132 which supports the armrest 120 the up position. When the armrest 120 is lifted again, the cam follower 130 follows the remaining path of the cam profile 132 upward until the cam follower 130 can no longer travel upward, when the armrest 120 is released in this position, the armrest 120 drops down to the level of the cushion of the bottom seat 62. The braces 136 are spring loaded so that the motion of the cam follower 130 through the cam profile 132 is controlled to drop into the v-shaped groove. The cam profile 132 also has a small spring tab 134 that directs the cam follower 130 into one side of the opening of the cam profile 132. The retractable arm and retraction mechanism can also be used on either armrest of the single seat 10.

Figure 3:
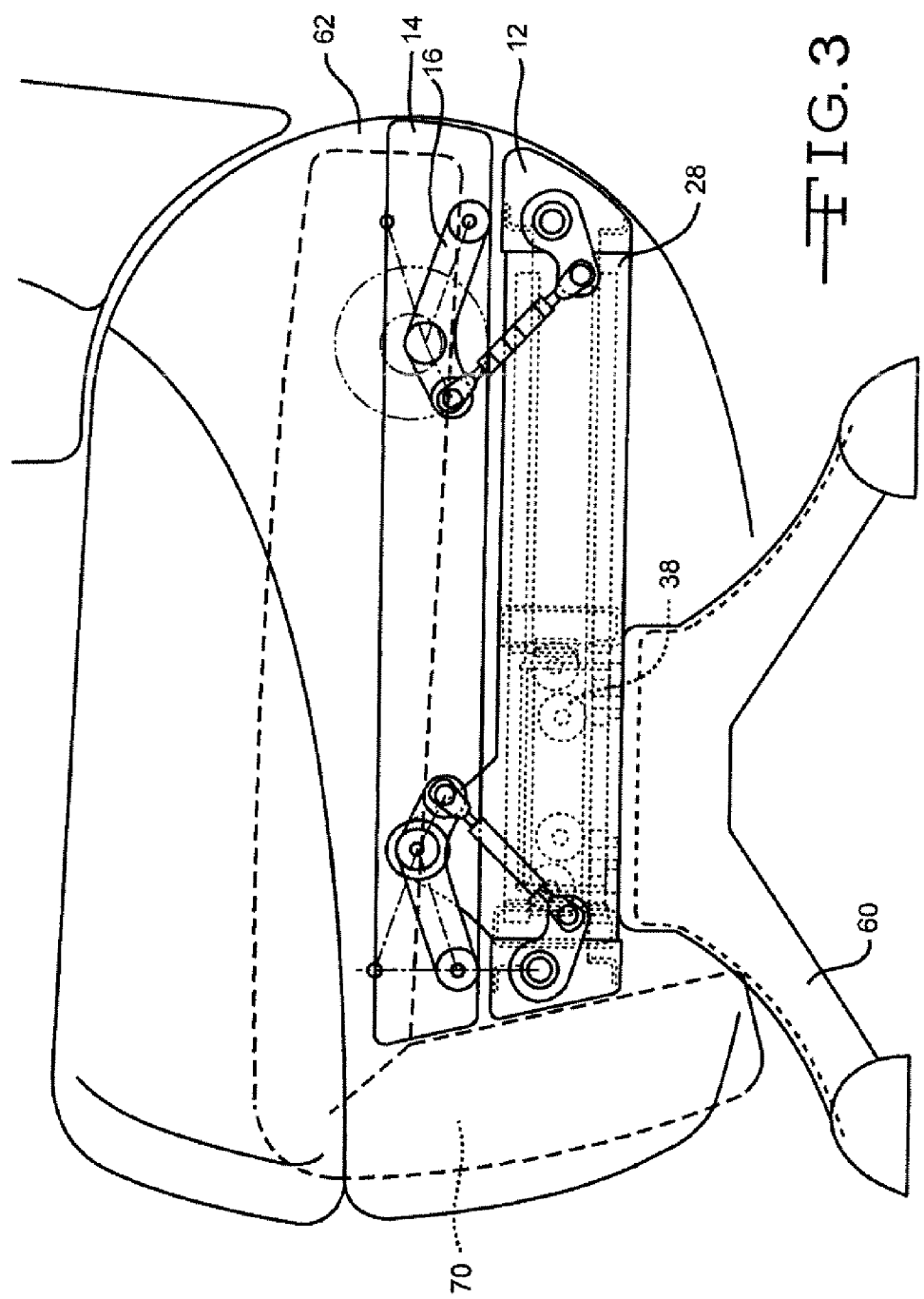
FIG. 3 is a side view of the bottom seat 62 of the aircraft seat 10 showing the leg base 60 and seat base 12.
Figure 4:
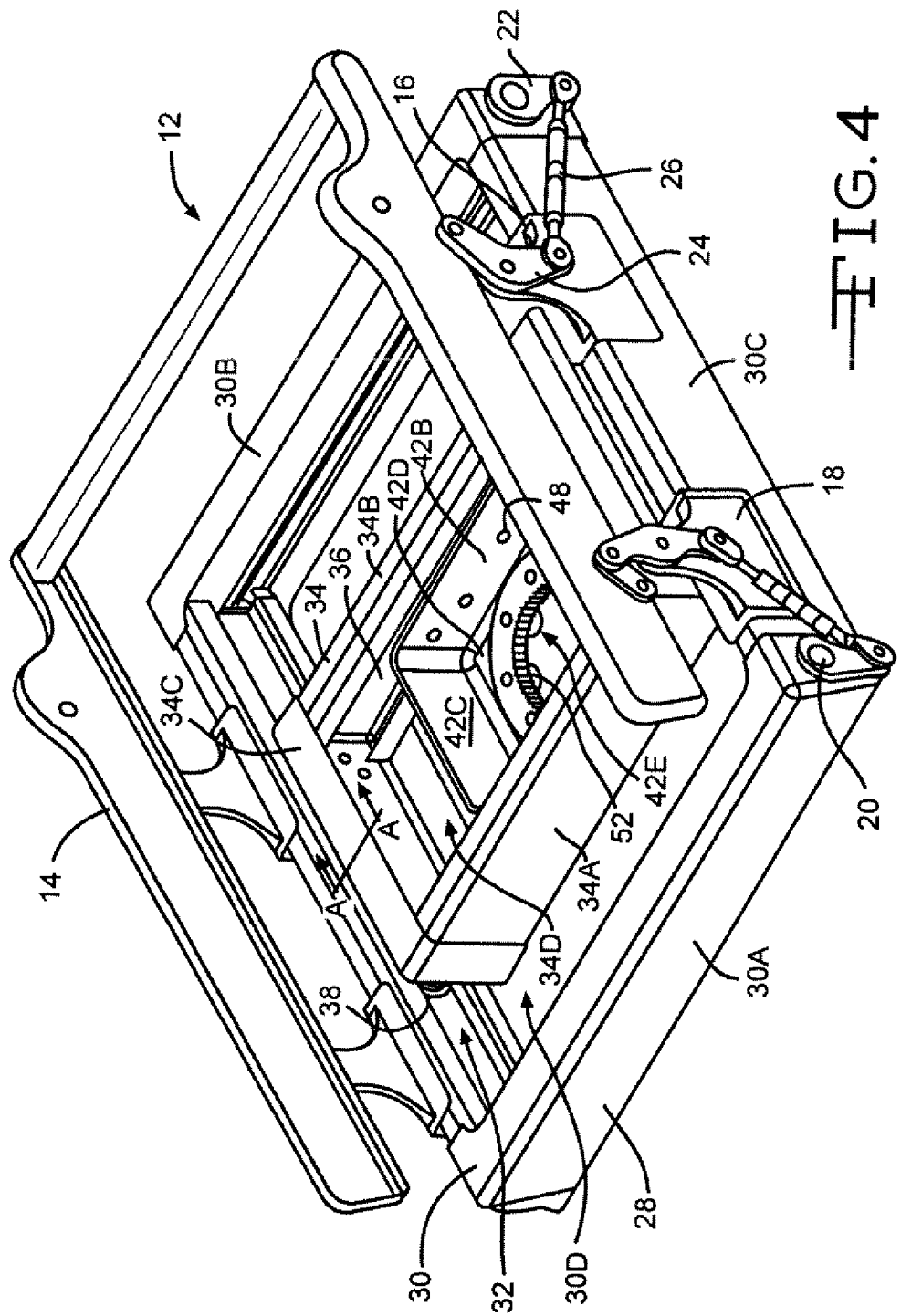
FIG. 4 is a perspective view of the seat base 12 showing the seat pan lift mechanism 16, the seat tracking mechanism 28 and the swivel mechanism 46.
Figure 12:
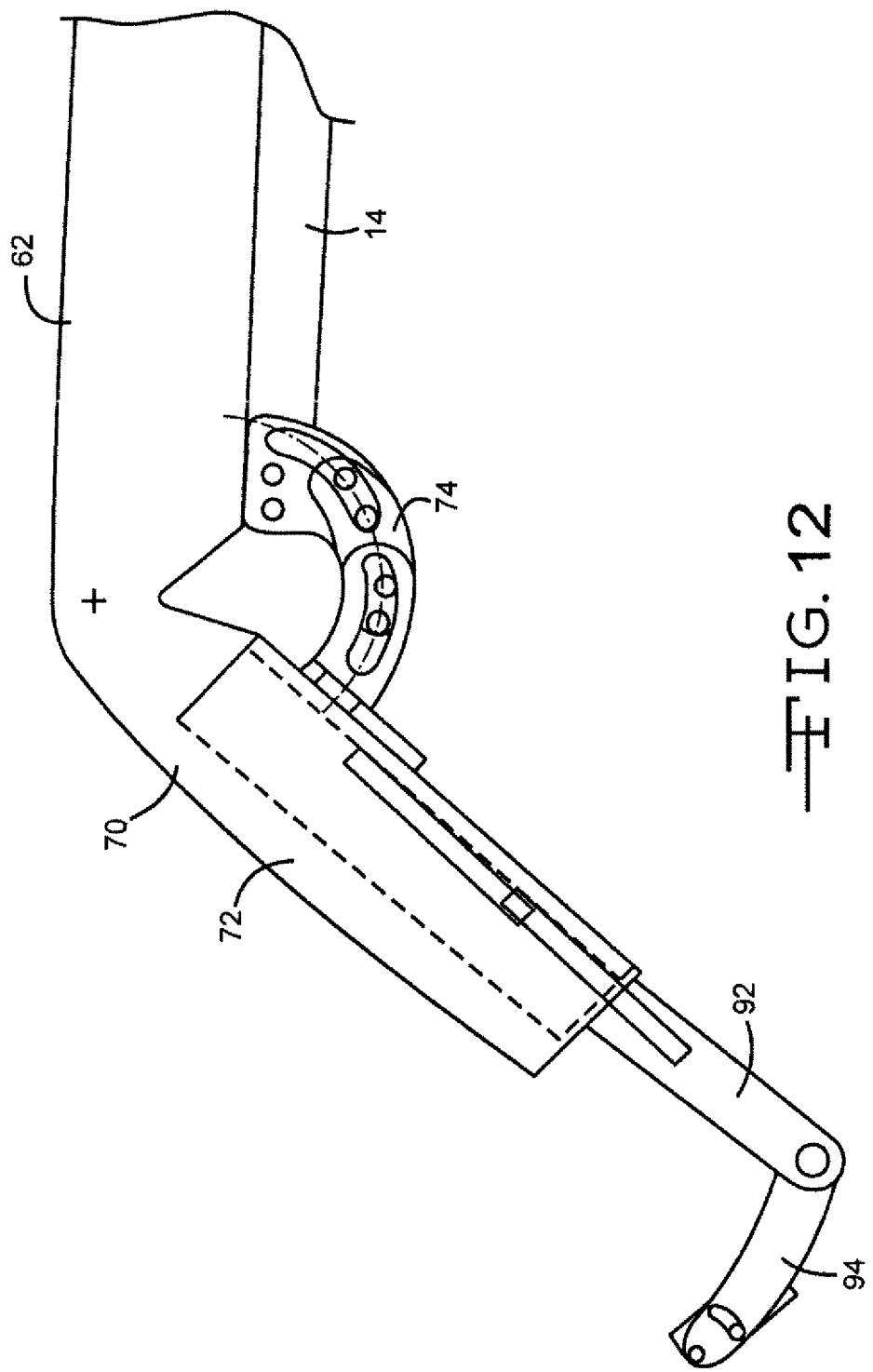
FIG. 12 is a side view of the leg rest 70 showing the hinge 74, the main body panel 72, the lower extension panel 92 and a heel kick 94.

The leg rest 70 includes a main body panel 72, a lower extension panel 92 and a heel kick 94. The leg rest 70 retracts behind the vertical position to ensure adequate passenger leg clearance (FIG. 3). In one (1) embodiment, the leg rest 70 retracts to achieve an angle that is 10° behind the vertical position. The main body panel 72 is driven by an electric or mechanical linear actuator that is attached to the seat pan 14. The main body panel 72 includes a manual override. The deployment of the main body panel 72 is achieved using a concealed hinge 74 that limits foam compression (wrinkling) when the leg rest 70 is pivoted and extended or brought back to the initial, stowed position (FIG. 12). In one (1) embodiment, the main body panel 72 of the leg rest 70 is deployed by a pair of hinges 74 adjacent each side of the main body panel 72. In another embodiment, a single hinge 74 is mounted in the center of the main body panel 72 and is used to deploy the main body panel 72. The hinge 74 has an inner plate 76, a center plate 78 and an outer plate 80. The plates 76, 78 and 80 have the same shape. The plates 76, 78, and 80 have an accurate shape with a curved slot 76C, 78C and 80C extending between the ends 76A, 76B, 78A, 78B, 80A and 80B. The plates 76, 78, and 80 are movably connected together by pins 82, 84, 86 and 88 (FIGS. 14, 15A-15C). The plates 76, 78, and 80 are slidably mounted together in a stacked relationship. The plates 76, 78, and 80 are connected together so that the plates 76, 78, and 80 fully overlap with the slots 76C, 78C, and 80C of the plates 76, 78, and 80 aligned and the sides of the plates 76, 78, and 80 aligned.

The first end 76A of the inner plate 76 is mounted to the underneath surface of the main body panel 72. In the fully extended position when the main body panel 72 is in the fully deployed position, the second end 76B of the inner plate 76 overlaps the first end 78A of the center plate 78 (FIG. 15A) A first and second pin 82 and 84 extend through the slots 76C and 78C in the inner and center plate 76 and 78. The first pin 82 is fixed in the slot 78C in the center plate 78 adjacent the first end 78A of the center plate 78 and moves in the slot 76C in the inner plate 76. The second pin 84 is fixed in the slot 76C in the inner plate 76 adjacent the second end 76B of the inner plate 76 and moves in the slot 78C in the center plate 78. The first pin 82 is spaced between the second pin 84 and the first end 78A of the center plate 78. The second end 78B of the center plate 78 overlaps the first end 80A of the outer plate 80. A third and fourth pins 86 and 88 extend though the center plate 78 and the outer plate 80. The third pin 86 is fixed in the slot 80C of the outer plate 80 adjacent the first end 80A of the outer plate 80 and moves in the slot 78C of the center plate 78. The fourth pin 88 is fixed in the slot 78C of the center plate 78 adjacent the second end 78B of the center plate 78 and moves in the slot 80C of the outer plate 80. The fourth pin 88 is spaced between the third pin 86 and the second end 80B of the outer plate 80. The second end 80B of the outer plate 80 is fixably mounted to the seat pan 14. In one (1) embodiment, the actuator 90 for moving the hinge 74 is a linear drive. The linear drive moves the plates 76, 78, and 80 of the hinge 74 to deploy and stow the main body panel 72 of the leg rest 70. However, it is understood that any manual or electrical means can be used to move the hinge 74. In one (1) embodiment, the linear drive is mounted to the seat pan 14. The end of the shaft of the linear drive is connected to the first end 76A of the inner plate 76 adjacent the leg rest 70.

In the fully stowed position, the plates 76, 78, and 80 of the hinge 74 fully nest and overlap and are fully aligned (FIG. 15C). In the fully stowed position, the second and fourth pins 84 and 88 are at the end of the slot 80C of the outer plate 80 adjacent the second end 80B of the outer plate 80. To deploy the main body panel 72 of the leg rest 70, the first end 76A of the inner plate 76 is moved away from the first end 80A of the outer plate 80 and the first end 78A of the center plate 78. In the partially deployed position, the center plate 78 fully overlaps the outer plate 80 and only the second end 76B of the inner plate 76 overlaps the first end 80A of the outer plate 80 and the center plate 78 (FIG. 15B). In the fully deployed position, the second end 76B of the inner plate 76 overlaps the first end 78A of the center plate 78 and the second end 78B of the center plate 78 overlaps the first end 80A of the outer plate 80 (FIGS. 14 and 15A).

The hinge 74 allows for the pivot point of the main body panel 72 of the leg rest 70 to be at a point above the main body panel 72 (FIG. 12). The radius or the center of the pivot point of the hinge 74 is at a point above the cushion of the main body panel 72. By controlling that pivot point and minimizing the amount of compression from the change in angle of the main body panel 72 of the leg rest 70, wrinkles in the foam of the main body panel 72 are eliminated. The hinge 74 provides a way to mount the leg rest 70 to the seat pan 14 which gives the appearance of a continuous cushion. To avoid wrinkling, the hinge 74 ensures that the radius of the circle on which the pins 82, 84, 86, and 88 travel in the slots 76C, 78C, and 80C is longer than the distance from the slots 79C, 78C and 80C to the upper surface of the main body panel 72. The center of the circle defined by that radius is on the passenger side of the seat bend. The position of the pivot point relative to the cushion of the main body panel 72 avoids wrinkling of the cushion. As the pins 82, 84, 86, and 88 move and travel along the slots 76C, 78C, and 80C, the radius of the circle does not change. In one (1) embodiment, the main body panel 72 of the leg rest 70 includes a hidden enclosure to house the life vest under a trim panel that can be accessed while seated.

The lower extension panel 92 of the leg rest 70 is deployed telescopically from inside the main body panel 72 and raises when deployed so that the main body panel 72 and lower extension panel 92 are level and form a continuous flat surface. The mechanism for moving the lower extension panel 92 is needed when the lower extension panel 92 is deployed. In one (1) embodiment, the mechanism is covered by a molded piece. The leg rest 70 includes a manual retractable heel kick 94 that folds flat against the lower extension panel 92 and is concealed inside the main body panel 72 when the lower extension panel 92 is stowed. In one (1) embodiment, a molded insert or cap is optionally installed on the heel kick 94. The cushion of the main body panel 72 of the leg rest 70 is combined with the cushion of the seat bottom as one (1) element. When the heel kick 94 is stowed and lower extension panel 92 is retracted into the main body panel 72, the heel kick 94 and the lower extension panel 92 are not visible.

In one (1) embodiment, the backrest frame assembly is manufactured using aluminum stampings that are ergonomically pre-shaped for passenger comfort. The stamped metal structure increases the seat rigidity. Cushions are molded using poured foam construction. Poured foam provides smoother rounded organic surfaces and ensures better adherence to upholstery material. A spring suspension system is incorporated in the upper backrest 96 to permit the reduction of cushion thickness and increase passenger comfort. The backrest 96 is constructed using precisely molded upholstery foam.

In one (1) embodiment, the backside of the seat backrest 96 is covered with a lightweight removable molded composite back shell (not shown) which provides ease of upholstery and simplified access to the internal portions of the seat 10 or 210. In one (1) embodiment, the backrest 96 includes a four (4) way powered inflatable lumbar support. The backrest recline is powered and independently actuated with a manual override. The recliner has multiple user settings. In one (1) embodiment, the back rest reclines from 90° to full flat berthing position. In one (1) embodiment, the backrest 96 includes heating, cooling and massage features in all positions. The electrical system has a pressure force limiting sensor and a thermal overload protection. In one (1) embodiment, the backrest 96 includes two (2) speakers. The speakers are imbedded in the cushion and covered with acoustically transparent foam to ensure smooth trim finish and great acoustics. The backrest frame assembly of the double seat is substantially identical to the seat backrest 96 of the single seat. In one (1) embodiment, the backrest 96 is constructed using molded components.

The headrest assembly 100 for the double seat 210 is substantially similar to the headrest 102 for the single seat 10. Therefore, only the headrest 102 for the single seat 10 will be described in detail. The headrest assembly 100 has vertical, longitudinal, and pitch adjustment. The headrest movement and adjustment can be powered electrically or manually. In one (1) embodiment, the headrest assembly 100 includes a headrest support 104, the headrest 102 and a pair of retractable wings 114 (FIG. 17). In one (1) embodiment, the headrest support 104 includes a first section 104A and a second section 104B. The first section 104A is slidably mounted on the backrest 96 of the seat 10. The first section 104A of the headrest support 104 allow for vertically adjusting the headrest 102. In one (1) embodiment, the headrest 102 is vertically adjustable in unlimited increments. In one (1) embodiment, the headrest 102 is manually adjusted in the vertical direction. The first section 104A of the headrest support 104 can be mounted to the backrest 96 of the seat 10 by any means well known in the art. The second section 104B of the headrest support 104 is pivotally mounted on one (1) end of the first section 104A. The second section 104B can be pivoted so as to move the headrest 102 forward (FIG. 16). The headrest 102 is pivotally mounted on the end of the second section 104B opposite the first section 104A. In one (1) embodiment, the second section 104B can only be pivoted forward and cannot be pivoted beyond the vertical position so that the headrest 102 is always aligned with or in front of the backrest 96 of the seat 10. In one (1) embodiment, a torque insert 106 is mounted on the back side of the headrest 102. The second end of the second section 104B is pivotally mounted on the torque insert 106. The torque insert 106 allows for holding the headrest 102 in a tilted position. The mounting of the headrest 102 to the headrest support 104 allows for tilting the headrest 102. The headrest 102 can be mounted to the headrest support 104 by any means well known in the art. The headrest support 104 allows for adjusting the headrest 102 for and aft to permit the passenger to use the headrest 102 in a partially reclined position for more function.

The wings 114 are mounted on the back of the headrest 102 and are able to be extended outward from the sides of the headrest 102 or retracted behind the headrest 102. The wings 114 allow for expanding the area of the headrest and for longitudinal and pitch adjustment for the headrest 102. The wings 114 are constructed similar to the headrest 102 with a front cushion portion and a back shell portion. The wings 114 are mounted to the headrest 102 by a slide mechanism 110 which connects to the back shell portion of the wings 114. The slide mechanism 110 includes an upper flange 110A with an upper slot 110C, a lower flange 110B with a lower slot 110D, and a pair of sliding guides 112 (one shown). In one (1) embodiment, the upper and lower flanges 110A and 110B are mounted to the back surface of the headrest 102. The upper flange 110A includes a left and right upper slot 110C. The left upper slot is adjacent to the left side of the headrest 102 and the right upper track is adjacent to the outside of the headrest 102. Similarly, the lower flange 110B includes a left and right lower slot adjacent to the left and right side of the headrest 102, respectively. The upper and lower slots 110C and 110D are substantially similar. In one (1) embodiment, the upper and lower slots 100C and 100D are curved. In one (1) embodiment, the outside ends of the upper and lower slots 110C and 110D adjacent to the outer edges of the headrest 102 curve forward toward the front of the headrest 102. In one (1) embodiment, the slots 110C and 110D have a recessed detent 110E at each end to lock the wings 114 in the fully extended or fully retracted position.

The sliding guides 112 are substantially similar and therefore only the left sliding guide will be discussed in detail. The left sliding guide 112 has opposed ends with a top pin 112A at one end and a bottom pin 112B at the opposed end. In one (1) embodiment the top pin 112A and bottom pin 112B are a pairs of pins. An upper arm 112C and a lower arm 112D extend outward from opposed ends of the sliding guide 112. The wing 114 is pivotally mounted between the upper and lower arms 112C and 112D of the sliding guide 112. In one (1) embodiment, the wing 114 has a three-sided shape. The first side 114A is mounted to the sliding guide 112 and is substantially straight. The top end of the first side 114A is provided with a torque insert 116 which pivotally mounts to the upper arm 112C of the sliding guide 112 (FIG. 18A). The second end of the first side 114A has an groove 114D which is pivotally mounted on a protrusion 112E extending upward from the lower arm 112D of the sliding guide 112. The second side 114B of the wing 114 extends outward from the second end of the first side 114A in a substantially perpendicular direction. The third side 114C of the wing 114 curves from the first end of the first side 114A to the second end of the second side 114B. However, it is understood that the wing 114 can have a variety of shapes. In one (1) embodiment, the back surface of the wing 114 adjacent the third side 114C of the wing 114 is provided with a groove 114E or indention which allows for easier gripping of the wing 114 to move the wing 114 from the retracted to extending position. A removable back cover 118 is provided which attaches to the flanges 110A and 110B to cover the sliding guides 112 and the wings 114 when the wings 114 are in the fully retraced and stowed position. The back cover 118 provides an enclosure for storage of the wings 114 and slide mechanism 110.

In the fully retracted position, the wings 114 are stowed behind the headrest 102 and are not visible. To move the wings 114 to the extended position, a user grabs the grooves 114E in the third side 114C of the wing 114 and pulls outward. It is understood that the wings 114 can be electronically moved or manually moved. The pins 112A and 112B of the sliding guide 112 move along the upper and lower slots 110C and 110D of the upper and lower flanges 110A and 110B as the wing 114 is moved outward. When the wing 114 is in the fully extended position, the pins 112A and 112B are in detents 110E in the end of the slots 110C and 110D which locks the wing 114 in the extended position. The wing 114 can also be pivoted on the arms 112C and 112D of the sliding guide 112 to angle the wing 114 forward. The torque insert 116 of the wing 114 assists in keeping the wing 114 in the angled position. In one (1) embodiment, the wings 114 are moved manually and can be moved separately. In one (1) embodiment, the wings 114 are moved electrically and the two (2) wings 114 are moved simultaneously. In one (1) embodiment, the headrest 102 has a four (4) way motion which is electrically or manually powered.

To retract the wings 114 and stow the wings 114 behind the headrest 102, the wings 114 are moved into the unpivoted position. The wings are then pushed along the slots 110C and 110D toward the center of the headrest 102 and into the space behind the headrest 102. In one (1) embodiment, once the wings 114 are fully retracted, the headrest 102 can be lowered to the fully stowed position. In the fully stowed position, the headrest 102 does not extend above the backrest 96 of the seat 10 and 210 and the headrest 102 is stowed within a cutout in the front surface of the cushion of the backrest 96 (FIG. 2). It is understood that the headrest 102 and the wings 114 can be constructed of any materials well known in the art for constructing headrests of aircraft seats. In one (1) embodiment, the headrest 102 uses a vacuum molded composite structure constructed from thin fiberglass skins bonded on either side of a Nomex honeycomb core. In one (1) embodiment, the headrest 102 is constructed using precisely molded upholstery foam.

The seat includes a passenger restraint system (not shown). The passenger restraint system is similar for the single or double seat. In one (1) embodiment, the passenger restraint system includes only a lap belt. A single lap belt restraint system lowers the center of gravity and reduces the trajectory of the head. Use of a single lap belt restraint system reduces the weight of the seat base 12. By using only a lap belt, the loads are transmitted directly into the bottom seat 62 and seat base 12 as opposed to going through the backrest 96. The use of only a lap belt provides a more direct load path down to the floor attachments and reduces the loads through that load path. The lap belt is attached directly to the seat tracking mechanism 28 to provide a direct load path and to minimize the head trajectory. In one (1) embodiment, the lap belt includes an auto retracting inertia reel on the male end of the restraint. In one (1) embodiment, the passenger restraint system includes a push button restraint which has a buckle which is smaller than a traditional push button restraint. To facilitate the seat cushion adjustments, the lap belt anchors are attached to the seat pan 14 using self aligning clip-on shackles. The inertial reel allows the passenger restraint system to move as the passenger moves through the different positions. In one (1) embodiment, the passenger restraint system includes a three (3) point restraint system consisting of a lap belt and a shoulder strap with an inertia reel. The inertia reel is attached to the backrest 96 and a decorative plastic molded escutcheon and is molded into the top of the back shell panel to permit deployment of the shoulder strap. The shoulder strap is positioned to cross over the inboard shoulder of the seated occupant.

In one (1) embodiment, the seat control (not shown) is mounted in the inboard armrest face. The seat control is attached in a plastic molded cradle with a auto retracting tether for ease of access in upright or berthing positions. The seat control controls all motion, environmental and massage functions. The seat control uses touch screen technology with easy to use icons for switching between positioning, motion, environmental and massage functions. In one (1) embodiment, the seat control allows three (3) pre-programmed functions for take off and landing, berthing and lazy-boy positions. In one (1) embodiment, the seat control allows for two (2) user programmable positions. In one (1) embodiment, the seat control controls the passenger occupant sensor on/off override to provide the ability to move a seat without a seated passenger. In the double seat, the seat controls are located in the armrest top under a hinged door which has a small latch. Optionally, the seat incorporates environmental conditioning and massage functions that are activated through the seat control. In one (1) embodiment, a molded manual override control handle for manual recline, tracking and swivel function is integrated into the armrest. In one (1) embodiment, the manual tracking and swivel release function is on one (1) handle and the recline release function is on a second handle. Manual override cables, levers, and associated components are rigged to eliminate slack or play and do not generate noise or rattling during taxi, takeoff, landing, and turbulence.

The seat includes motorized seat functions for tracking, swivel, full flat recline, headrest adjustment, leg rest adjustment, and seat cushion height, extension and incline adjustment. Control of the motorized seat function is managed through an electronic controller capable of coordinated motion control, memory functions, power management, collision avoidance and positive position feedback monitoring. In one (1) embodiment, the motorized seat functions are controlled using a central control unit mounted behind the removable back shell of the backrest 96. In one (1) embodiment, all motion mechanisms are contained within the seat and are controlled with a handheld remote control touch screen system that can be housed in a recessed injection molded enclosure within the armrest. The motorized seat functions are operated using linear and rotary actuators. The actuators provide continuous position feed back and feature thermal overload protection and force sensing circuitry to prevent damage to the aircraft interior. The actuators govern the recline, tracking, swivel, and leg rest functions and are capable of manual override in case of loss of power.

In one (1) embodiment, the seat is provided with a lumbar system (not shown). In one (1) embodiment, the lumbar system uses a series of pneumatic bladders that inflate and deflate to provide the necessary contour adjustments. A pneumatic lumbar control is installed in the backrest 96 behind the removable backrest shell. Optionally, a four (4) way lumbar adjustment mechanism enables the passenger to tailor the seat cushion contour to maximize personal comfort and enables the backrest cushion to be completely flat when in the full berthing position. In one (1) embodiment, the seat includes a massage system. In one (1) embodiment, a vibratory massage system is integrated into the seat backrest 96. In one (1) embodiment, the massage system includes a controller, four vibratory motors, and multiple user settings. In one (1) embodiment, the seat includes an environmental control system, heating and cooling system. In one (1) embodiment, a seat heating system is integrated into the seat bottom and back cushions. In one (1) embodiment, the seat heating system includes a controller and two (2) heating elements. In one (1) embodiment, the environmental conditioning and massage functions can be activated through the same controller.

The single seat 10 operates in either forward or aft facing orientation. In one (1) embodiment, the single seat 10 is available in overall widths ranging from approximately 24 inches (610 mm) to approximately 28 inches (711 mm). The cushions of the seat are molded using poured foam processes and precision tooling to enhance finished quality, comfort and durability of the product. The seat is manufactured using technologies for stamped metal construction, forgings, laser cutting, and investment casting processes. In one (1) embodiment, the armrests and leg rests are fabricated using vacuum formed composite structures made from using thin fiberglass skins bonded on either side of a NOMEX honeycomb core. In one (1) embodiment, the molded structural components combine the shrouds or covers and seat into shapes that can be directly upholstered. In one (1) embodiment, the aircraft seat 10 or 210 uses the molded composite components molded with hidden fasteners that are designed to minimize the upholstery material needed to create the final shape of the part. The use of less upholstery material reduces the weight of the seat, reduces assembly time, and increases the quality of the finished seats.

The double seat 210 is substantially constructed in the same manner as the single seat. Similar to the single seat in design and manufacturing, the double seat 210 includes retractable armrests. The double seat 210 operates in forward and aft facing positions. As with the single seat 10, the use of molded shrouds allows for enclosure of emergency and cosmetic lights directly in the seat and provides for ease of upholstery and maintenance. All motorized seat functions are contained within the seat and are controlled with an easy to access and use touch screen control system that can be located in the armrest top under a hinged door. The electronic components are located in the outboard armrest. In one (1) embodiment, the double seat 210 has an overall width of approximately 47 inches (1194 mm) and a width of 19.75 inches (501.65 mm) between armrests. However, the size of the seats 10 and 210 can vary.

In one (1) embodiment, the double seat 210 has a leg rest. In one (1) embodiment, the double seat 210 does not have a leg rest. The style of the seat cushion of the double seat is substantially similar to the style of the single seat. The seat cushion geometry lies 10° behind the vertical position to ensure passenger leg clearance. The seat cushion extends over the front portion of the seat pan 14 and covers the front shroud. In one (1) embodiment, the front shroud includes a hidden enclosure to house the life vest under a trim panel to be accessed while seated.

In one (1) embodiment, the seat 10 or 210 incorporates a telescopic retractable reading light. A reading light is incorporated directly in the backrest 96 of the seat so that the passenger always has optimum lighting. The reading light deploys in a retractable arc designed to adjust to the passenger's reading/view path. The light fixture is articulated for proper light direction adjustment. In one (1) embodiment, the personal reading light assembly has a retractable arm, and an adjustable light fixture. In one (1) embodiment, the retractable arm of the reading light is recessed into seat backrest 96 for takeoff and landing. In one (1) embodiment, the double seat 210 incorporates the reading light.

In one (1) embodiment, the vacuum formed composite armrest and leg rest reduces component weight and time for assembly by reducing need to adjust shape with upholstery and cold bonding flat panel joints. Precisely machined tools are used to continually produce molded components such as the seat cushion foam, armrest composite structure, and seat frame metal stampings in higher volume quantities and shorter lead-times than traditional CNC machined and flat panel composite parts. The aircraft seat 10 or 210 of the present invention uses the minimum number of parts with fewer connections to reduce the cost of assembly and increase component structural strength, stiffness, and durability. In one (1) embodiment, the molded trims and parts in the seat reduces weight through reduction of resin while increasing tolerance control and part strength. The layup composite structure of the armrest eliminates bonded joints or pin joints and increases the tolerance control of finished parts. Poured foam cushions increase tolerance control and reduce handling costs.

In the foregoing description, various features of the present invention are grouped together in a single embodiment for the purpose of streamlining the disclosure. This method of disclosure is not to be interpreted as reflecting an intention that the claimed discourse requires more features than are expressly recited in each claim. Rather, as the following claims reflect, inventive aspects lie in less than all features of a single foregoing disclosed embodiment. Thus, the following claims are hereby incorporated by reference herein in their entirety, with each claim standing on its own as a separate embodiment of the present invention.

It is intended that the foregoing description be only illustrative of the present invention and that the present invention be limited only by the hereinafter appended claims.

We claim:

1. A seat base for an aircraft seat comprising:
 a) a seat pan;
 b) an outer box having end rails and opposed side rails surrounding an interior of the outer box and having a top and a bottom;
 c) an inner box movably positioned in the interior of the outer box;
 d) a swivel box movably positioned in the inner box;
 e) a seat pan lift mechanism mounted on the outer box and attached to the seat pan for lifting and tilting the seat pan; and
 f) a swivel mechanism mounted in the swivel box and configured to be mounted on a leg base for the aircraft seat to rotate the seat base on the leg base.

2. The seat base of claim 1 wherein the swivel box moves laterally in the inner box to provide side to side movement of the aircraft seat.

3. The seat base of claim 1 wherein the inner box moves longitudinally in the outer box to provide fore and aft movement of the aircraft seat.

4. The seat base of claim 1 wherein the outer box has an outer track on each side rail and the inner box has wheels mounted adjacent to and in contact with the outer track on each side rail of the outer box.

5. The seat base of claim 1 wherein the inner box has end rails and the swivel box has end walls and side walls with wheels mounted on the end walls adjacent to and in contact with the end rails of the inner box.

6. The seat base of claim 4 wherein the outer track has a first track spaced apart and aligned with a second track.

7. The seat base of claim 6 wherein the outer track has an angled shape.

8. The seat base of claim 7 wherein a perimeter of the wheels of the inner box have a v-shaped groove.

9. The seat base of claim 8 wherein the wheels of the inner box are a set of wheels having a first wheel spaced apart horizontally and vertically from a second wheel.

10. The seat base of claim 4 wherein the inner box has opposed side rails and each side rail of the inner box has a first set of wheels spaced apart from a second set of wheels.

11. The seat base of claim 10 wherein a keeper is mounted on an outer surface of the side rail of the inner box spaced between the first set of wheels and the second set of wheels and wherein the keeper extends outward from the side rail and has a first flange and a second flange which are spaced apart from the outer surface of the side rails and which extend in opposite directions parallel to the outer surface of the side rail.

12. The seat base of claim 4 wherein the outer track has a first track spaced apart and parallel to a second track, wherein the wheels of the inner box have a first wheel spaced apart horizontally and vertically from a second wheel and wherein the first wheel is adjacent and in contact with the first track and the second wheel is adjacent and in contact with the second track.

13. The seat base of claim 4 wherein the inner box has sides rails with a keeper mounted on the side rails of the inner box adjacent the wheels configured to contact the outer track of the outer box.

14. The seat base of claim 1 wherein the swivel mechanism has an upper plate having a center opening and holes and configured to be connected to the aircraft seat and the base; an inner ring having a center opening and positioned adjacent the upper plate with spacers having a first end and a second end with a center bore extending therebetween and mounted on the upper plate on that the first end is adjacent the upper plate and the center bore of the spacers is aligned with the holes in the upper plate and a lower ring having a center opening and positioned adjacent the second end of the spacers.

15. The seat base of claim 14 wherein the center opening of the upper plate has gear teeth.

16. The seat base of claim 14 wherein a locking mechanism having a plunger pin is mounted adjacent the upper plate on a side opposite the inner ring, wherein the upper plate has holes spaced between a perimeter of the upper plate and the center opening and wherein to lock the swivel mechanism, the plunger pin of the locking mechanism is moved into one of the holes in the upper plate.

17. The seat base of claim 14 wherein the swivel box has a bottom wall with an opening and wherein the upper plate is mounted in the swivel box with the center opening adjacent the opening in the bottom wall.

18. The seat base of claim 17 wherein the seat base includes a leg base mounted on the swivel mechanism and wherein the bottom wall of the swivel box is spaced between the upper plate of the swivel mechanism and the leg base.

19. The seat base of claim 17 wherein the inner ring is spaced between the upper plate and the bottom wall.

20. The seat base of claim 17 wherein the lower ring is adjacent a side of the bottom wall of the swivel box opposite the upper plate.

21. The seat base mechanism of claim 17 wherein the spacers extend through the opening in the bottom wall and wherein the spacers act to center the swivel box on the leg base.

22. A seat base for an aircraft seat comprising:
a) a seat pan;
b) an outer box having end rails, opposed side rails with a top and a bottom with the rails having a height extending between the top and the bottom, the end rails and side rails surrounding an interior of the outer box;
c) an inner box movably positioned in the interior of the outer box and having end rails, side rails, a top and a bottom with the rails having a height extending between the top and the bottom;
d) a swivel box movably positioned in the inner box;
e) a seat pan lift mechanism mounted on the outer box and attached to the seat pan for lifting and tilting the seat pan; and
f) a swivel mechanism mounted in the swivel box and configured to be mounted on a leg base for the aircraft seat to rotate the seat base.

23. The seat base of claim 22 wherein the inner box is positioned completely within the interior of the outer box and does not extend beyond the top or the bottom of the outer box.

24. The seat base of claim 23 wherein the inner box moves longitudinally in the outer box and moves the aircraft seat fore and aft.

25. The seat base of claim 22 wherein the swivel box is positioned completely within the interior of the outer box and does not extend beyond the top or the bottom of the outer box.

26. The seat base of claim 25 wherein the swivel box moves laterally in the outer box to provide side to side movement of the aircraft seat.

27. The seat base of claim 22 wherein the rails and top and bottom of the inner box surround an interior of the inner box and wherein the swivel box is slidably positioned in the interior of the inner box.

28. The seat base of claim 27 wherein the swivel box is positioned completely within the interior of the inner box and does not extend beyond the top or the bottom of the inner box.

29. The seat base of claim 28 wherein the swivel box moves laterally in the inner box and moves the aircraft seat side to side.

30. The seat base of claim 22 wherein the seat base includes a leg base mounted on the swivel mechanism.

31. A seat base for an aircraft seat comprising:
a) a seat pan;
b) an outer box having end rails and opposed side rails surrounding an interior of the outer box and having a top and a bottom;
c) an inner box movably positioned in the interior of the outer box;
d) a swivel box movably positioned in the inner box;
e) a seat pan lift mechanism mounted on the outer box and attached to the seat pan for lifting and tilting the seat pan;
f) a swivel mechanism mounted in the swivel box; and
g) a leg base mounted on the swivel mechanism.

32. The seat base of claim 31 wherein the leg base has a center section having a center opening and legs extending outward at an angle from the center section.

33. The seat base of claim 32 wherein the center section has a substantially circular shape and the legs are substantially equally spaced apart around the center section.

* * * * *